United States Patent
Gu et al.

(10) Patent No.: US 11,520,371 B2
(45) Date of Patent: Dec. 6, 2022

(54) COMPUTE-ADAPTIVE CLOCK MANAGEMENT FOR MACHINE LEARNING ACCELERATORS

(71) Applicant: Northwestern University, Evanston, IL (US)

(72) Inventors: Jie Gu, Evanston, IL (US); Tianyu Jia, Binzhou (CN)

(73) Assignee: Northwestern University, Evanston, IL (US)

( * ) Notice: Subject to any disclaimer, the term of this patent is extended or adjusted under 35 U.S.C. 154(b) by 61 days.

(21) Appl. No.: 17/170,187

(22) Filed: Feb. 8, 2021

(65) Prior Publication Data
US 2021/0247797 A1 Aug. 12, 2021

Related U.S. Application Data

(60) Provisional application No. 62/972,382, filed on Feb. 10, 2020.

(51) Int. Cl.
| | |
|---|---|
| *G06F 1/08* | (2006.01) |
| *G06F 9/50* | (2006.01) |
| *G06F 1/12* | (2006.01) |
| *G06N 3/063* | (2006.01) |

(52) U.S. Cl.
CPC ............... *G06F 1/08* (2013.01); *G06F 1/12* (2013.01); *G06F 9/5027* (2013.01); *G06N 3/063* (2013.01)

(58) Field of Classification Search
CPC .. G06F 15/8007; G06F 9/3887; G06F 9/3814; G06F 1/08; G06F 1/12; G06F 9/5027; G06N 3/063
See application file for complete search history.

(56) References Cited

U.S. PATENT DOCUMENTS

| | | | | |
|---|---|---|---|---|
| 8,467,218 B1* | 6/2013 | Atsatt | ................... | G06F 13/405 |
| | | | | 365/63 |
| 9,143,122 B1* | 9/2015 | Gaide | ...................... | G06F 1/10 |
| 10,784,871 B1* | 9/2020 | Xanthopoulos | ....... | H03L 7/0812 |
| 10,915,297 B1* | 2/2021 | Halutz | ................... | G06F 17/153 |
| 11,321,096 B2* | 5/2022 | Martin | ...................... | G06F 7/50 |
| 2007/0245131 A1* | 10/2007 | Yoshikawa | ......... | G06F 15/7867 |
| | | | | 712/220 |
| 2008/0201526 A1* | 8/2008 | Yabe | ................... | G06F 15/7867 |
| | | | | 711/E12.001 |

(Continued)

*Primary Examiner* — Aurel Prifti

(74) *Attorney, Agent, or Firm* — Benesch, Friedlander, Coplan & Aronoff LLP

(57) ABSTRACT

A system for clock management in an m columns×n rows array-based accelerators. Each row of the array may include a clock domain that clocks runtime clock cycles for the m processing elements. The clock domain includes a data detection and timing control circuit which is coupled to a common clock phase bus which provides a local clock source in multiple selectable phases, wherein the data detection and timing control circuit is configured to select a clock phase to clock a next clock cycle for a next concurrent data processing by the m processing elements. Each of m processing elements is coupled to access data from a first memory and a second memory and to generate respective outputs from each of the m processing elements to a corresponding m processing element of a same column in a subsequent neighboring row for the next processing in the next clock cycle.

18 Claims, 19 Drawing Sheets

(56) References Cited

U.S. PATENT DOCUMENTS

| | | | |
|---|---|---|---|
| 2012/0200322 A1* | 8/2012 | Block | G06F 1/08 |
| | | | 327/142 |
| 2013/0290799 A1* | 10/2013 | Tekumalla | G01R 31/318563 |
| | | | 714/E11.155 |
| 2014/0149780 A1* | 5/2014 | Dally | G06F 1/12 |
| | | | 713/503 |
| 2015/0236700 A1* | 8/2015 | Townley | H03K 19/17796 |
| | | | 326/38 |
| 2016/0098059 A1* | 4/2016 | Sood | G06F 1/12 |
| | | | 713/600 |
| 2017/0351318 A1* | 12/2017 | Gu | G06F 9/30145 |
| 2018/0006653 A1* | 1/2018 | Duong | G06F 1/08 |
| 2018/0143940 A1* | 5/2018 | Shenton | G06F 15/8023 |
| 2018/0287616 A1* | 10/2018 | Townley | G06F 1/06 |
| 2019/0018815 A1* | 1/2019 | Fleming | G06F 9/5027 |
| 2019/0101952 A1* | 4/2019 | Diamond | G06F 15/825 |
| 2019/0303153 A1* | 10/2019 | Halpern | G06F 9/3005 |
| 2020/0012706 A1* | 1/2020 | Chen | G06F 17/16 |
| 2020/0250520 A1* | 8/2020 | Ross | G06F 17/153 |
| 2020/0409717 A1* | 12/2020 | Huynh | G06F 9/4881 |
| 2021/0200711 A1* | 7/2021 | Pillai | G06N 3/063 |
| 2021/0224125 A1* | 7/2021 | Liu | G06F 9/5027 |

\* cited by examiner

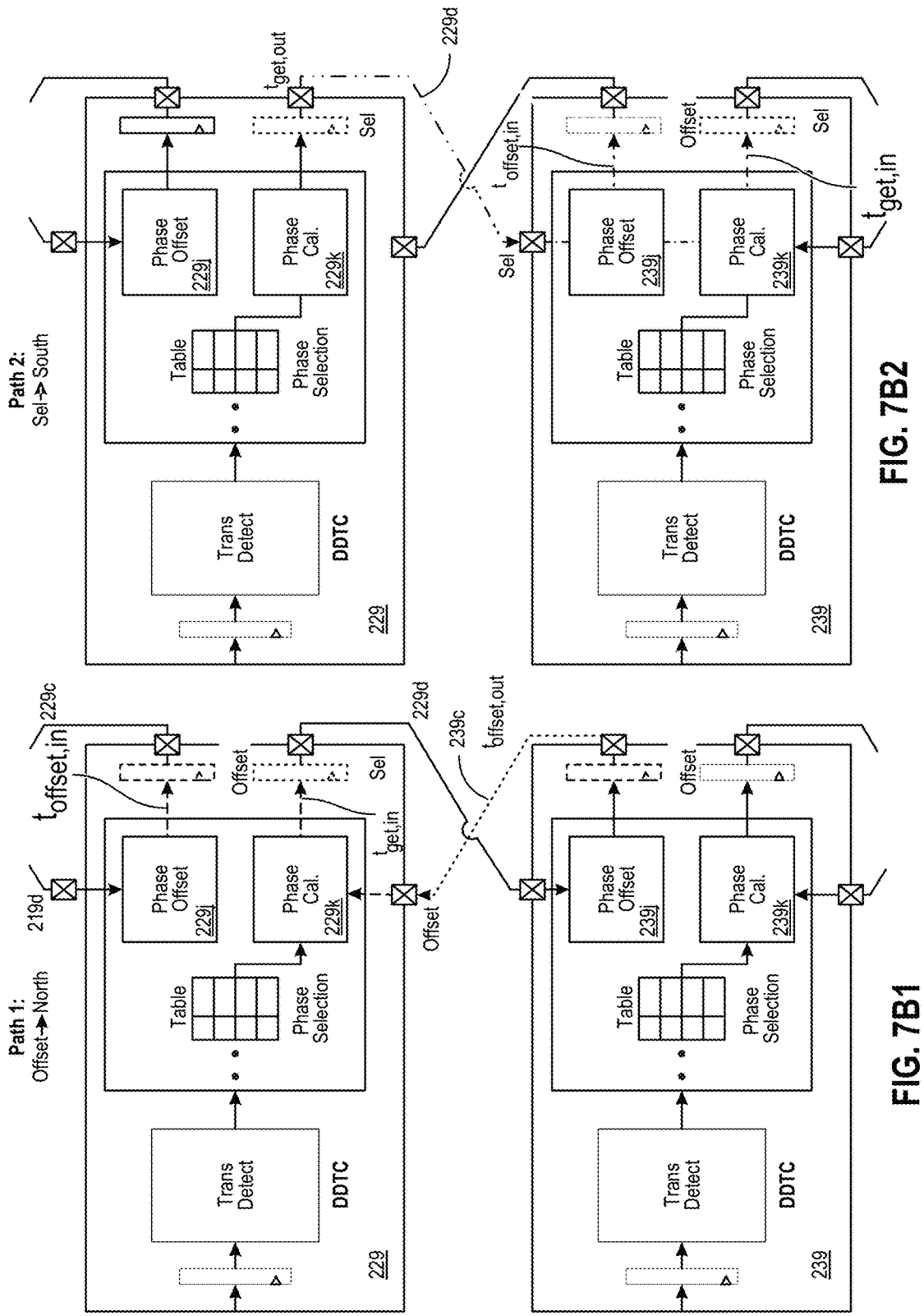
FIG. 7B1
FIG. 7B2

COMPUTE-ADAPTIVE CLOCK MANAGEMENT FOR MACHINE LEARNING ACCELERATORS

CROSS-REFERENCE

This disclosure claims priority to and the benefit from U.S. Provisional Patent Application Ser. No. 62/972,382 titled "Compute-Adaptive Clock Management For Machine Learning Accelerators", filed on Feb. 10, 2020, which is herein incorporated by reference in its entirety.

STATEMENT OF FEDERALLY FUNDED RESEARCH OR SPONSORSHIP

This disclosure was made with government support under grant number (CCF-1618065) awarded by the National Science Foundation. The government has certain rights in the invention.

TECHNICAL FIELD

This disclosure relates to the field of clock management for machine learning accelerators, using a multi-phase multi-domain clocking scheme and compute-driven clock management to array-based accelerators.

BACKGROUND OF THE DISCLOSURE

Recently, 2D (two-dimensional) PE (processing element) array-based accelerators have been developed for machine learning (ML) applications. Many efforts have been dedicated to improve the energy efficiency of such accelerators, e.g. DVFS (Differential Voltage Frequency Scaling) management for the DNN (Dynamic Neural Networks) under various bit precision. A razor technique was also applied to a 1D (one-dimensional) 8-MAC (Multiplier Accumulator) pipelined accelerator to explore timing error tolerance. Despite of the above efforts, a fine-grained dynamic-timing-based technique has not been implemented within a large 2D array based ML accelerator. One main challenge comes from the large amount of compute-timing bottlenecks within the 2D array in concurrent or parallel processing of long instructions, which will continuously trigger critical path adaptation or pipeline stalls, nullifying the benefits of previous dynamic-timing techniques.

SUMMARY OF THE DISCLOSURE

Systems and methods for clock management in data processing in array-based accelerators are provided. According to an embodiment as shown in FIG. 2A, the system 200 may include having a plurality of processing elements 210 to 277 of array-based accelerators arranged in an array with n rows and m columns of processing elements for concurrent data processing, wherein m and n are both integers greater than or equal to two. Each row (e.g., rows 0 to row 15) of the array may include a clock domain ($CDM_0$ to $CDM_{15}$) that clocks respective runtime clock cycles $T_{CLKx}$ for each of the m processing elements 210 to 217 for the concurrent data processing within a current row (e.g., row 0), wherein the clock domain (e.g., $CDM_0$) may include a data detection and timing control circuit (e.g., 219) which is coupled to a common clock phase bus 303 which provides a local clock source (e.g., $CLK_0$ to $CLK_{15}$) in multiple selectable phases (e.g., $P_0$ to $P_{27}$), wherein the data detection and timing control circuit is configured to select a clock phase to clock a next clock cycle $T_{CLKx+1}$ for a next concurrent data processing by the m processing elements 210 to 217. The system 200 may include a first memory 206a storing first data 205a and a second memory 204a storing respective second data 203a to 203m which are accessible by each of m processing elements 210 to 217 in the clock domain (e.g., $CDM_0$) for the concurrent data processing and to generate respective outputs 210a to 217a from each of the m processing elements 210 to 217 to a corresponding m processing element 220 to 227 of a same column in a next subsequent neighboring row (row 1) for the next concurrent data processing in the next clock cycle $T_{CLKx+1}$. An interface 190 to 197 may be used to couple to each of the m processing elements 270 to 277 of a last row (e.g., row 15) of the array to output or store (e.g., memory 398) respective final data 198 from the concurrent data processing by the plurality of processing elements 210 to 277 in the array.

Another aspect of the disclosure is a method for clock management in data processing by array-based accelerators. The method as shown in FIG. 8 may include a step 810 of managing a clock domain (e.g., $CDM_0$) for concurrent data processing by a plurality of processing elements 220 to 227 within array-based accelerators, wherein the plurality of processing elements are arranged in an array of n rows and m columns of processing elements for processing data, wherein m and n are both integers greater than or equal to two. The clock domain is used to clock runtime clock cycles $T_{CLKx}$ for each of the m processing elements for concurrent data processing within a current row (e.g., row 0), wherein the clock domain (e.g., $CDM_0$) may include a data detection and timing control circuit (e.g., 219) which is coupled to a common clock phase bus 303 which provides a local clock source in multiple selectable phases. In step 820, the managing of the clock domain (e.g., $CDM_0$) for clocking the m processing elements may be performed by the data detection and timing control circuit selecting a clock phase for clocking a next clock cycle $T_{CLKx+1}$ for a next concurrent data processing by the m processing elements. Concurrent data processing may involve step 830 of be carried out by the m processing elements in the clock domain accessing first data 205a stored in a first memory and respective second data 203a to 203m stored in a second memory for the data processing. In step 840, each of the m processing elements may generate respective outputs to a corresponding m processing element 220 to 227 of a same column in a next subsequent neighboring row (e.g., row 2) for the next concurrent data processing in the next clock cycle $T_{CLKx+1}$. Respective final data 198 from the concurrent data processing from the m processing elements 270 to 277 of a last row of the array may be output through an interface 190 to 197 or to be stored in a memory 398.

BRIEF DESCRIPTION OF DRAWINGS

The disclosure is better understood with reference to the following drawings and description. The elements in the figures are not necessarily to scale, emphasis instead being placed upon illustrating the principles of the disclosure. Moreover, in the figures, like-referenced numerals may designate to corresponding parts throughout the different figures.

FIG. 1AA illustrates a typical processing element/Multiplier Accumulator (PE/MAC) unit in a m columns and n rows array-based accelerators.

FIGS. 7B1 and 7B2 illustrate timing closure signal paths between neighboring clock domains for synchronization and timing control.

DETAILED DESCRIPTION

An artificial intelligence (AI) accelerator is a class of specialized hardware accelerator or computer system designed to accelerate artificial intelligence applications, especially in machine learning (ML), artificial neural networks and machine vision. Typical applications include algorithms for robotics, internet of things and other data-intensive or sensor-driven tasks. Accelerators are often multi-core designs and generally focus on low-precision arithmetic, novel dataflow architectures or in-memory computing capability suitable for concurrent or parallel processing of long instructions.

To deal with the large amount of compute-timing bottlenecks within a two-dimensional (2D) array of processing elements (PE) or accelerators, which may continuously trigger critical path adaptation or pipeline stalls, several solutions are to be described. A local in-situ compute-detection scheme may be applied to anticipate upcoming timing variations within each of the PE units and guide both instruction-based and operand-based adaptive clock management. To loosen the stringent timing requirements in a large 2D PE array, an "elastic" clock-chain technique using multiple loosely synchronized clock domains was developed that enables dynamic timing enhancement through clusters of PE units.

Figure 1A:
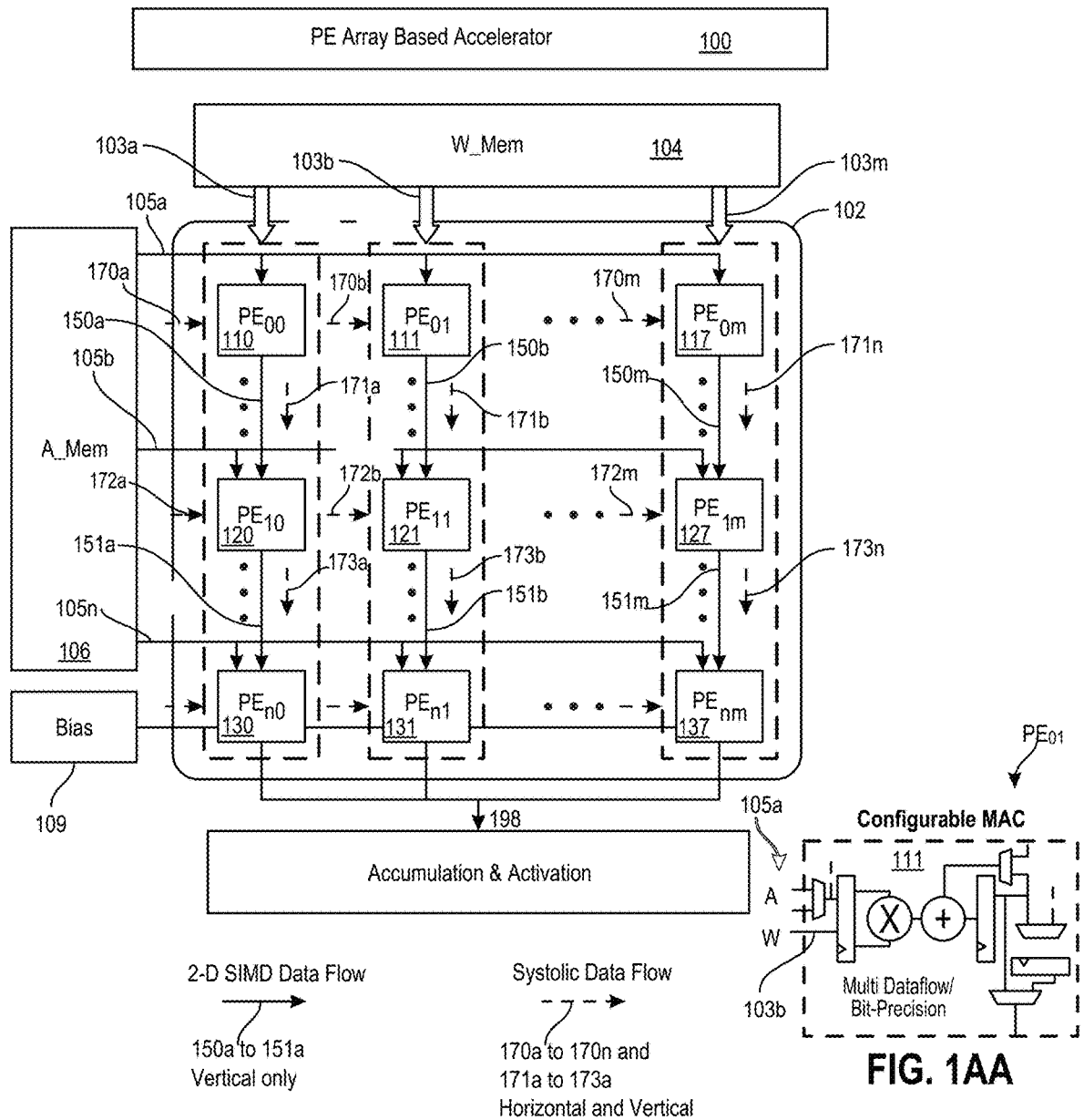
FIG. 1A illustrates an array-based accelerators system 100 for data processing.

FIG. 1A illustrates a system of array-based accelerators 100 for data processing. The array-based accelerators 100 may include a plurality of processing elements (PE) 110-137 arranged in an array of n rows and m columns of processing elements $PE_{01}$ to $PE_{nm}$ for concurrent data processing, wherein m and n are both integers greater than or equal to two.

The PE array design PE01 to PEnm may be used as deep-neural-network (DNN) accelerator to support dataflow of both 2D Single Instruction Multiple Data (SIMD) dataflow (e.g., concurrent vertical dataflow along a same column, e.g., 150a to 151a, 150b to 151b, 150m to 151m) and a tightly-coupled systolic array dataflow (e.g., concurrent horizontal dataflow along a same row e.g., 170a to 170n and vertical dataflow along a same column, e.g., 171a to 173a).

Figure 2A:
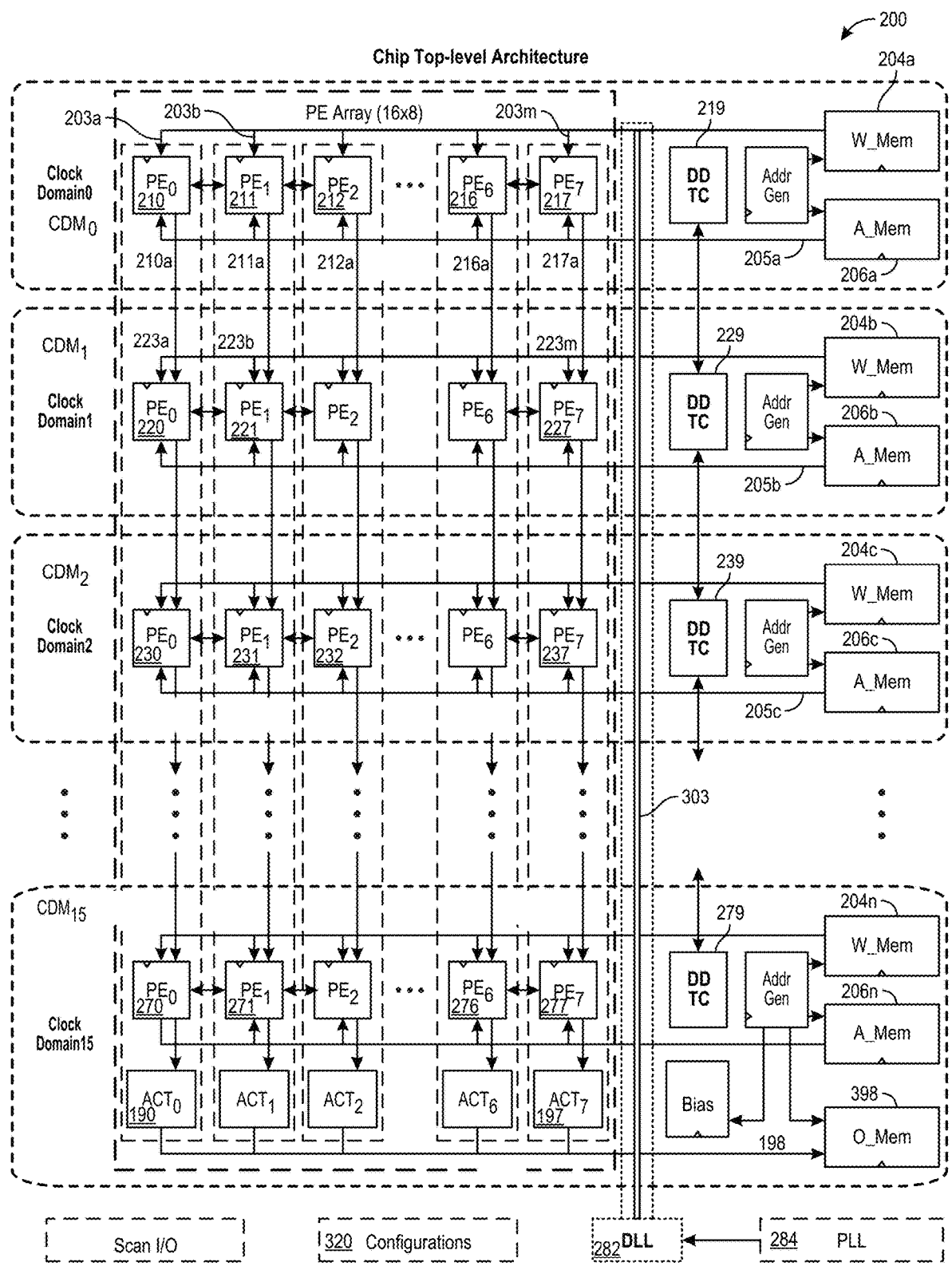
FIG. 2A illustrates an exemplary top-level chip architecture of array-based accelerators formed by an array 16×8 (128) processing elements/Multiplier Accumulators (PE/MAC) units.

For example, in a case of the 2D single instruction multiple dataflow type processing, each of the m processing elements (e.g., $PE_{10}$ to $PE_{1m}$) in each current row (e.g., row 1) may be configured to: receive common first data 105b from the first memory 104, receive respective second data for each individual m processing element (similar to 223a for $PE_{10}$ to 223m for $PE_{1m}$ from memory 204b in FIG. 2A) from the second memory 104. In addition, and processing elements $PE_{10}$ to $PE_{1m}$ may each receive applicable respective output data (150a to 150n) generated in a last clock cycle $T_{CLKx-1}$ from a corresponding processing element $PE_{00}$ to $PE_{0m}$ in a same column of a previous row, which may be immediately before the current row (e.g., row 0). Processing elements $PE_{10}$ to $PE_{1m}$ may each process respectively in parallel in the runtime clock cycle $T_{CLKx}$, the received common first data 105b, the respective second data (similar to 203a to 203m) and the applicable respective output data 150a to 150m generated in the last clock cycle $T_{CLKx-1}$ from the corresponding processing element $PE_{00}$ to $PE_{0m}$ in the previous row (row 0), to generate respective output data 151a to 151m to a corresponding processing element $PE_{n0}$ to $PE_{nm}$ in a same column of a next row.

In a case of the systolic array dataflow type processing, each of the m processing elements (e.g., $PE_{11}$) is configured to perform the following respectively: receive one of: an applicable output 172b from a processing element (e.g., $PE_{10}$) of a previous column (column 0) within a same current row (row 1) and first data 105b received from the first memory 106, receive respective second data (e.g., similar to 223b in FIG. 2A but not shown in FIG. 1A) from the second memory 104 for each individual m processing element (e.g., $PE_{10}$ in FIG. 1A), and applicable respective output data (e.g., 171b) generated in a last clock cycle $T_{CLKx-1}$ from a corresponding processing element (e.g., $PE_{01}$) in a same column (column 1) of a row (e.g., row 0) which may be immediately before the current row (e.g., row 1). Processing elements $PE_{10}$ to $PE_{1m}$ may process respectively in parallel in the current runtime clock cycle $T_{CLKx}$, the one of received output (e.g., 172b) from the processing element (e.g., $PE_{10}$) of the previous column (e.g., column 0) within the same current row e.g., (row 1) and the received first data 105b, the respective second data (similar to 203b)

and the applicable respective output data (e.g., 171*b*) generated in the last clock cycle $T_{CLKx-1}$ from the corresponding processing element (e.g., $PE_{01}$) in the same column (column 1), to generate respective output data (173*b*) to a corresponding processing element (e.g., $PE_{n1}$) in a same column (column 1) of a next row (row n).

In implementation, all processing elements $PE_{01}$ to $PE_{nm}$ 110-137, such as $PE_{01}$ 111 as shown in FIG. 1AA, may be a configurable Multiplier Accumulator (MAC) unit that may process data 105*a* from memory 106 in variable bit precision, such as from 1 bit to 8 bits to support both the SIMD dataflow and the systolic dataflow. Higher precision bit values may also be configured.

Figure 1B:
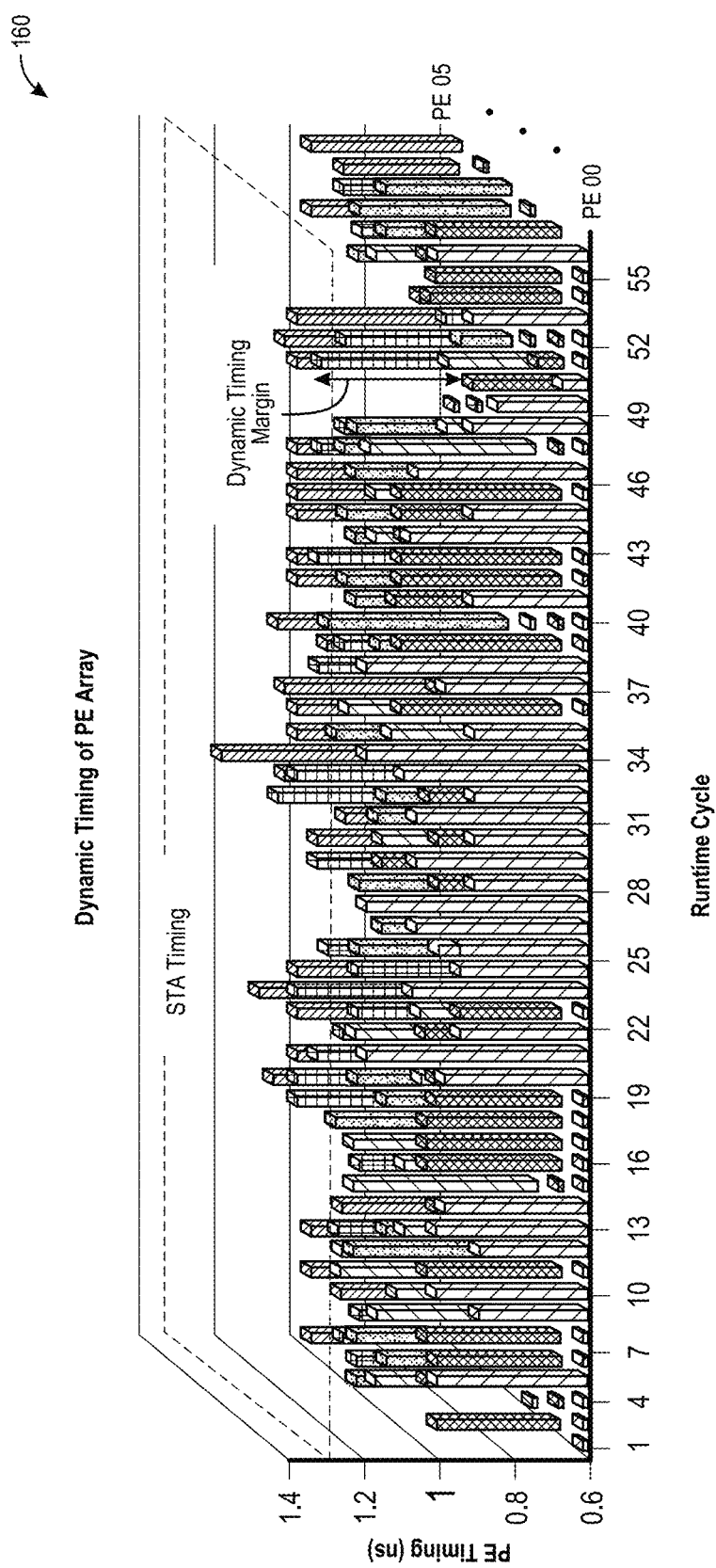
FIG. 1B illustrates dynamic timing issues in array-based accelerators.

FIG. 1B illustrates dynamic timing issues in array-based accelerators. A commercial Electronic design automation (EDA) tool may be used to find out a static timing analysis (STA) method on the worst-case timing under certain transitioning conditions and the operand timing dependency. Significant dynamic timing slack existed with single PE. Each PE has unique timing when processing different operands.

Figure 1C:
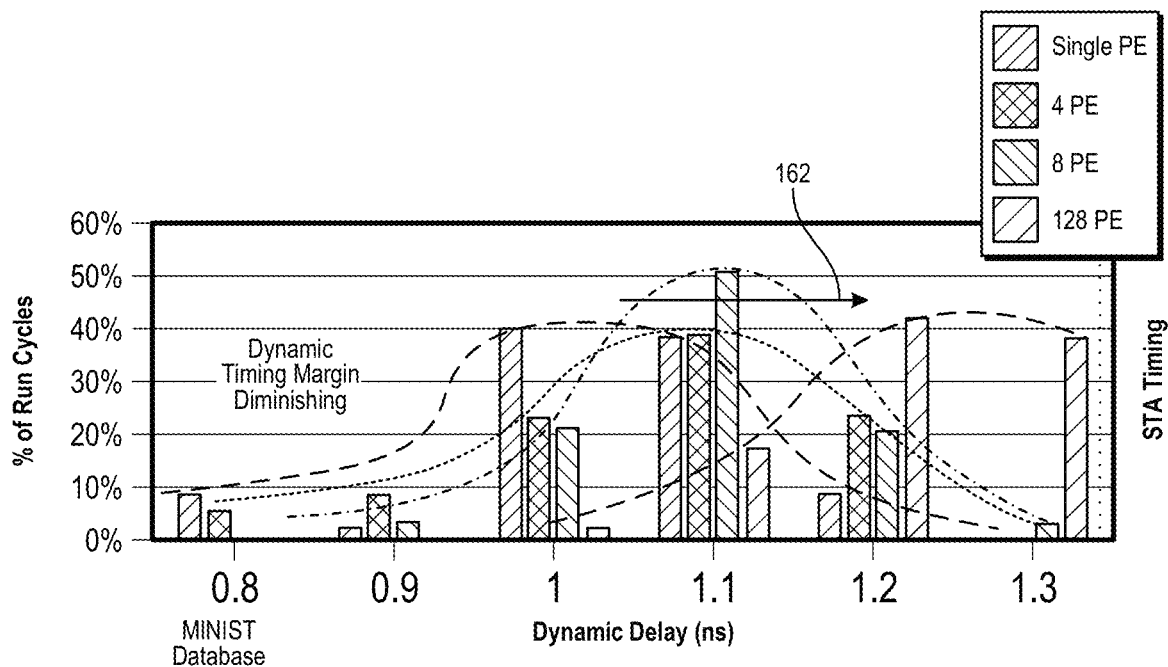
FIG. 1C illustrates dynamic delays for array-based accelerators of different array sizes.

FIG. 1C illustrates dynamic delays for array-based accelerators of different array sizes. An arrow 162 shows that a high number of PE leads to diminishing timing margin.

Figure 1D:
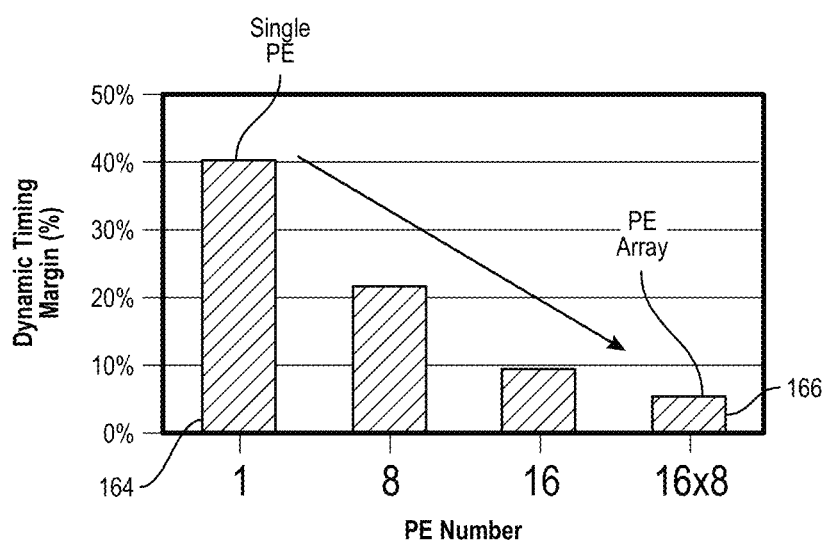
FIG. 1D illustrates dynamic timing margins in array-based accelerators of different array sizes.

FIG. 1D illustrates dynamic timing margins in array-based accelerators of different array The simulation results of the cycle-by-cycle timing variation of a single PE unit running the Modified National Institute of Standards and Technology (MINIST) database are shown in FIGS. 1C and 1D. A wide range of dynamic timing variation within each PE unit is observed. In addition, the longest critical paths are activated less than 5% of the time and are determined by the operands, e.g. at most significant bits (MSBs) change, leading to operand-dependent dynamic timing margin. However, the dynamic timing margin diminishes with the size of PE array increasing, i.e. reducing from 40% to only 4% when the number of PEs increases from 1 to 128, because a critical timing path can be activated in any PE unit. Therefore, centralized adaptive techniques cannot exploit the dynamic timing margin effectively for a large 2D PE array sizes.

FIG. 2A illustrates an exemplary top-level chip architecture of array-based accelerators system 200 formed by an array 16×8 (128) processing elements/Multiplier Accumulators (PE/MAC) units. As shown in FIG. 2A, the system 200 may include having a plurality of processing elements 210 to 277 of array-based accelerators arranged in an array with n rows and m columns of processing elements for concurrent data processing, wherein m and n are both integers greater than or equal to two. Each row (e.g., rows 0 to row 15) of the array may include a clock domain ($CDM_0$ to $CDM_{15}$) that clocks respective runtime clock cycles $T_{CLKx}$ for each of the m processing elements 210 to 217 for the concurrent data processing within a current row (e.g., row 0), wherein the clock domain (e.g., $CDM_0$) may include a data detection and timing control circuit (e.g., 219) which is coupled to a common clock phase bus 303 which provides a local clock source (e.g., $CLK_0$ to $CLK_{15}$) in multiple selectable phases (e.g., $P_0$ to $P_{27}$), wherein the data detection and timing control circuit is configured to select a clock phase to clock a next clock cycle $T_{CLKx+1}$ for a next concurrent data processing by the m processing elements 210 to 217.

The system 200 may include a first memory 206*a* storing first data 205*a* and a second memory 204*a* storing respective second data 203*a* to 203*m* which are accessible by each of m processing elements 210 to 217 in the clock domain (e.g., $CDM_0$) for the concurrent data processing and to generate respective outputs 210*a* to 217*a* from each of the m processing elements 210 to 217 to a corresponding m processing element 220 to 227 of a same column in a next subsequent neighboring row (row 1) for the next concurrent data processing in the next clock cycle $T_{CLKx+1}$. An interface 190 to 197 may be used to couple to each of the m processing elements 270 to 277 of a last row (e.g., row 15) of the array to output or store (e.g., memory 398) respective final data 198 from the concurrent data processing by the plurality of processing elements 210 to 277 in the array.

Figure 2B:
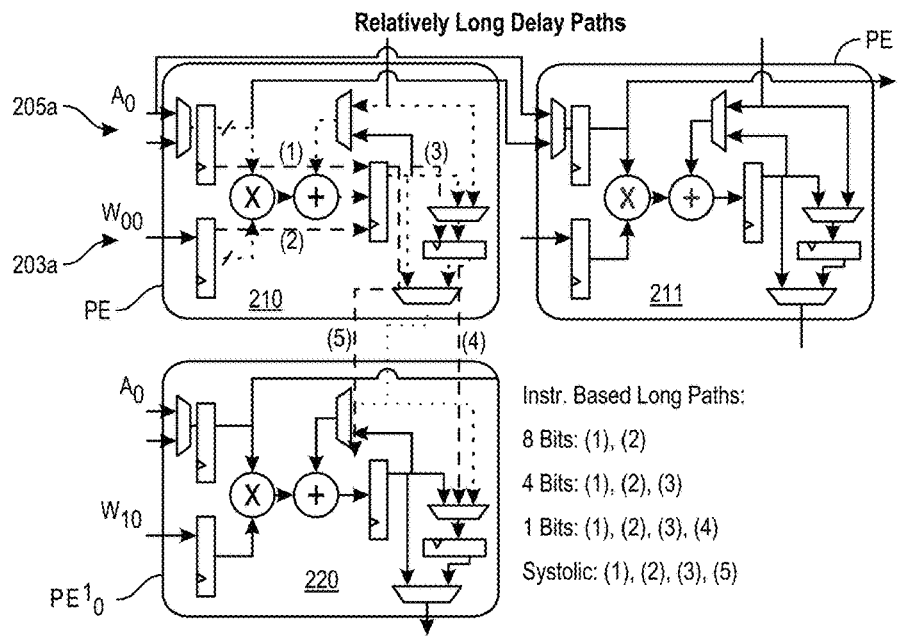
FIG. 2B illustrates exemplary long delay paths in processing elements of an accelerator.

FIG. 2B illustrates exemplary long delay paths in processing elements of an accelerator. The critical paths are dominated by the Multiplier Accumulator (MAC) operation logics. The delay in the long critical paths varies based on instructions/configurations such as SIMD dataflow or systolic dataflow. For example, a 4 bit MAC has shorter delay than an 8 bit MAC.

Figure 2C:
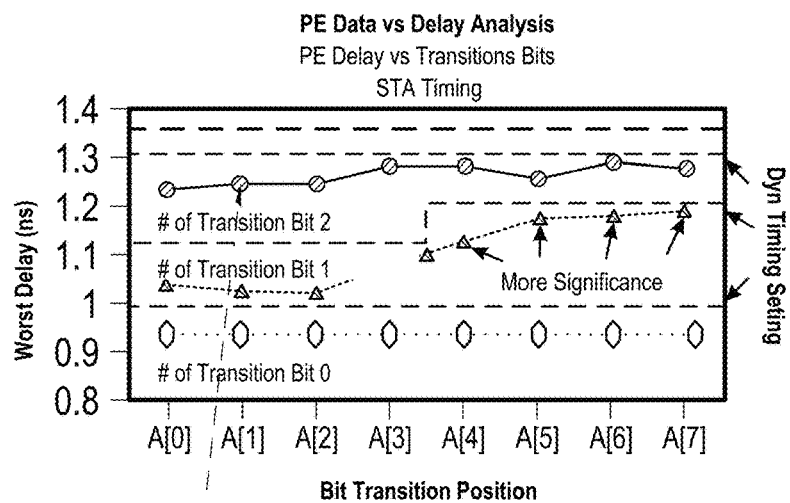
FIG. 2C illustrates exemplary timing delay analysis in processing elements of an accelerator.
Figures 2D, 2E:
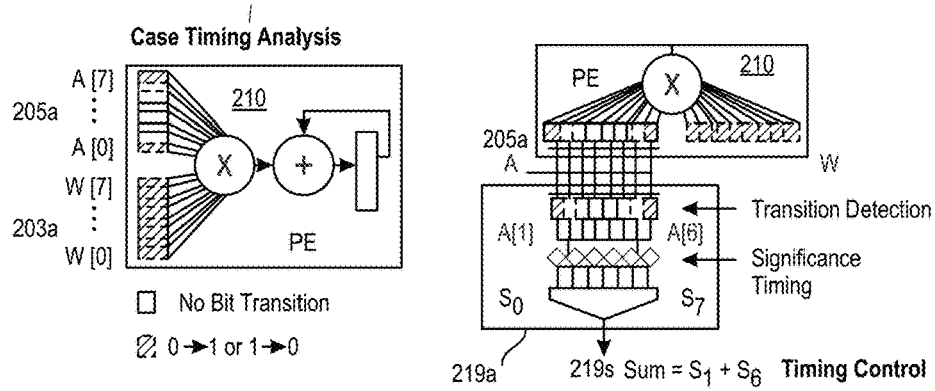
FIG. 2D illustrates transitioning bit positions in a processing element of an accelerator.
FIG. 2E illustrates timing control of bit transitioning detection in a processing element of an accelerator.

FIG. 2C illustrates exemplary timing delay analysis in processing elements of an accelerator. FIG. 2D illustrates transitioning bit positions in a processing element of an accelerator. For example, in FIG. 2A, the 16-row by 8-column PE array 200 architecture may support instructions (configurations) of both 2D SIMD dataflow and systolic dataflow with variable bit precision. Each row of 8 local PE units (e.g., 210 to 217) with supporting image/weight SRAMs (i.e., A memory 206*a* and W memory 204*a*) are clocked by a different clock domain (e.g., $CDM_0$). The critical timing paths inside a PE unit based on the instructions (configurations) of whether it is a 2D SIMD dataflow or a systolic dataflow have been analyzed. As shown in FIGS. 2B and 2C, the longest paths are dominated by MAC operations at high precision (8 bits), while critical paths are observed at varied PE locations when low precisions (4 bits or 1 bit) are used.

As shown in FIGS. 2C to 2D, the operand timing dependency may be determined by a case static timing analysis (STA) method using the commercial Electronic design automation (EDA) tool to find out the worst-case timing under certain transitioning conditions. A significant timing dependency on the number of transitioning bits (e.g., 8 bits vs. 4 bits) and the transitioning bits' positions (i.e., $A_{[0]}$ LSB to $A_{[7]}$ MSB) of the image SRAMs (i.e., A memory 206*a*) may be observed. The higher significance bits in positions $A_{[5]}$ to $A_{[7]}$ MSB have higher delays than the lower significance bits $A_{[0]}$ LSB to $A_{[4]}$).

FIG. 2E illustrates the use of a data detection and timing control (DDTC) circuit 219 to perform in-situ timing control of bit transitioning detection in a processing element 210 in the clock domain $CDM_0$ of the accelerator 200. To exploit such a relationship, a summation of the transitioning bits (e.g., $A_{[1]}$ to $A_{[6]}$) with programmable significance are calculated (e.g., Sum=$S_1+S_6$) as output 219*s*, which is used to guide the dynamic clock management by the DDTC 219 to determine a phase period and phase offset to clock a next clock cycle $T_{CLKx+1}$ for the processing elements 210 to 217 in the current clock domain (e.g., $CDM_0$).

Figure 3A:
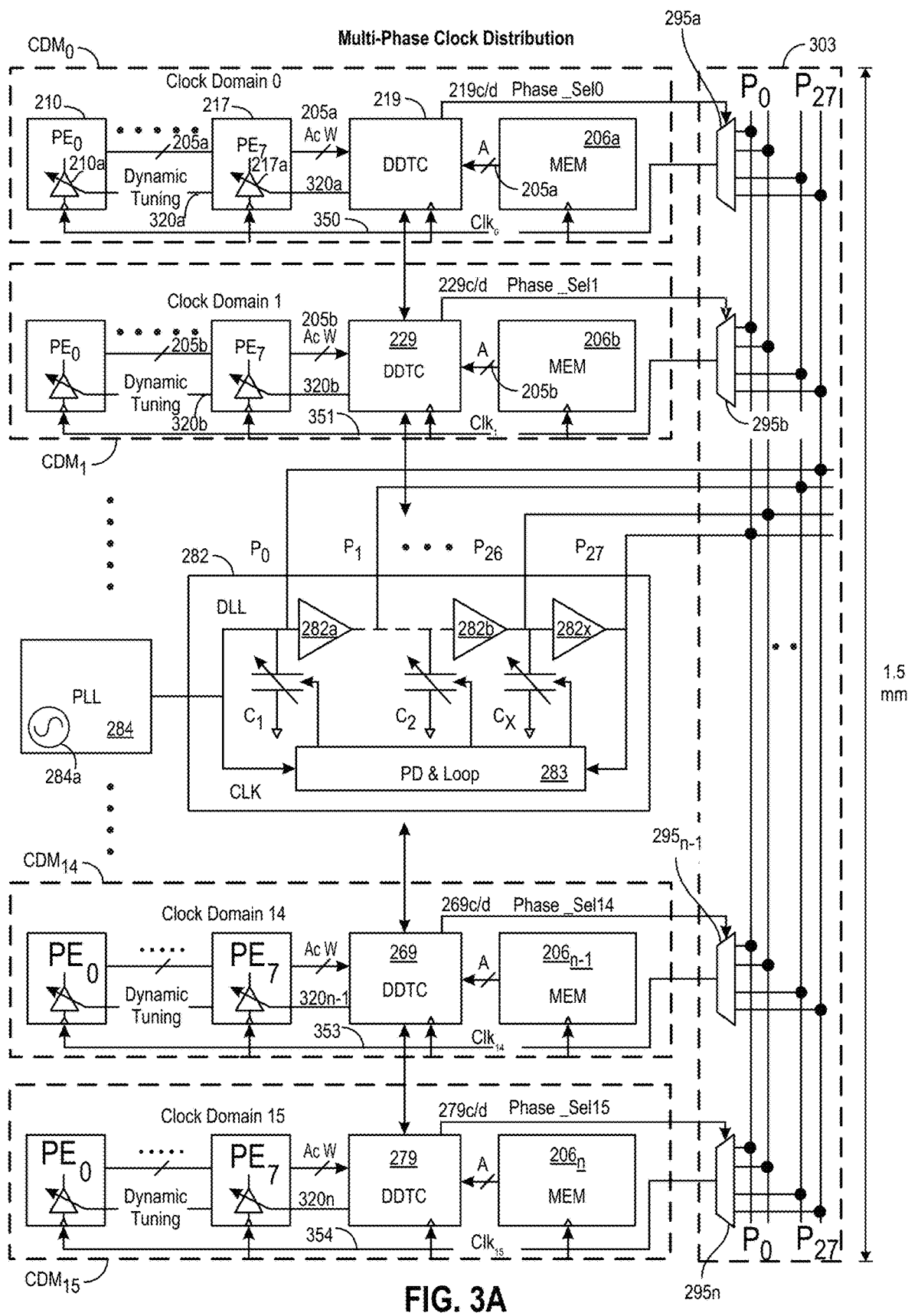
FIG. 3A illustrates a multi-phase clock bus design to distribute the clock sources to all clock domains.

FIGS. 3A-3D illustrates a compute-adaptive clock management technique, using data detection and timing controller (DDTC) modules (e.g., 219 to 279) coupled to a novel multi-phase clock bus 303 design to distribute the clock sources (e.g., $CLK_0$ to $CLK_{15}$) to all clock domains (e.g., $CDM_0$ to $CDM_{15}$). FIG. 3A illustrates a multi-phase multi-domain clocking scheme using a novel multi-phase clock bus 303 design to distribute the clock sources (e.g., $CLK_0$ to $CLK_{15}$) to all clock domains (e.g., $CDM_0$ to $CDM_{15}$). It is shown that root phase locked loop (PLL) 284 coupled to a reference clock source 284a may be used to feed a clock signal to a global delay locked loop (DLL) 282, which generates a plurality (>4) of equally delayed phases of clock edges using a series chain of delay stages 282a to 282x. In an embodiment, 28 equally delayed phases $P_0$ to $P_{27}$ may be generated for motion frames or other AI applications, but other phase resolution values higher or lower than 28 may be used.

In implementation, the 28 phases $P_0$ to $P_{27}$ may be sent into 16 clock domains (e.g., $CDM_0$ to $CDM_{15}$) through a global clock bus, such as the multi-phase clock bus 303 travelling a total distance of about 1.5 mm. Each phase (e.g., $P_2$) is generated from one delay stage (e.g., 282a) of the DLL 282, with a delay step of about 50 ps. The clocks (e.g., $CLK_0$ to $CLK_{15}$) for each clock domain (e.g., $CDM_0$ to $CDM_{15}$) are dynamically chosen from the 28 phases ($P_0$ to $P_{27}$) of the multi-phase clock bus 303 in a rotary manner (i.e., following a sequence to repeat itself in a loop), with a maximum phase offset constrained between neighboring clock domains (e.g., $CDM_0$ and $CDM_1$ as shown in FIG. 3C).

Figure 3B:
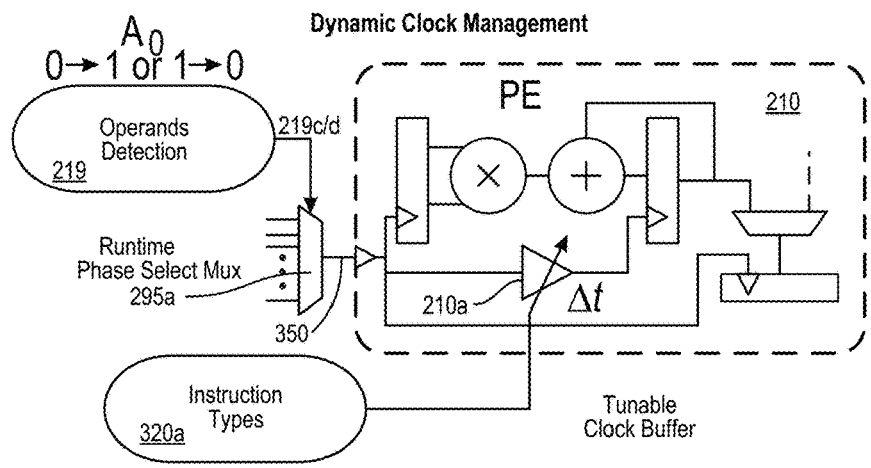
FIG. 3B illustrates a schematic of a cycle-by cycle dynamic clock management of a processing element by a data detection and timing control circuit.

The 28 wires of the multi-phase clock bus 303 are carefully matched at layout with dummy clocks at the boundaries, showing up to 4 ps mismatch among the nearby phases and 18 ps static mismatch from end to end across the long clock routing. The static mismatch across the long clock trace is not critical, as only neighboring clock domains need to be carefully synchronized. To exploit the instruction-based timing variation, tunable clock buffers (e.g., 210a to 217a see FIGS. 3A to 3B) are implemented for the PE units (e.g., 210 to 217) to rebalance the pipeline timing under different instructions. At each clock domain (e.g., $CDM_0$ to $CDM_{15}$), a data detection and timing controller (DDTC) module (e.g., 219 to 279) may be implemented to dynamically select one clock phase ($P_0$ to $P_{27}$) through a respective glitch-free phase selection multiplexer (mux) (e.g., 295a see FIG. 3D) based on the compute operands (e.g., operands detection from 0 to 1 or 1 to 0, see FIG. 3B) to exploit the runtime dynamic timing margin Δt. FIG. 3B illustrates a schematic of a cycle-by cycle dynamic clock management of a processing element 210 by a data detection and timing control circuit 219.

Figure 3C:
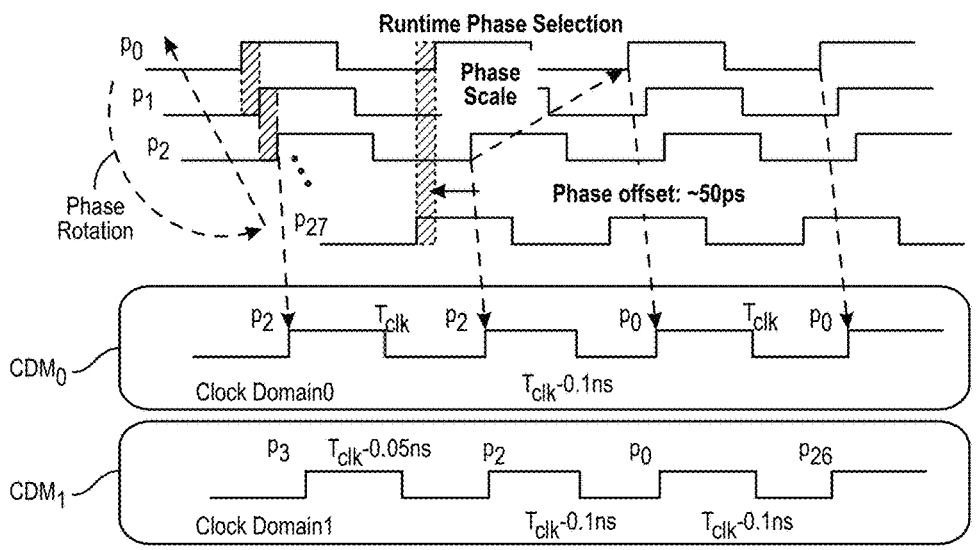
FIG. 3C illustrates runtime phase selection in clock domains.
Figure 3D:
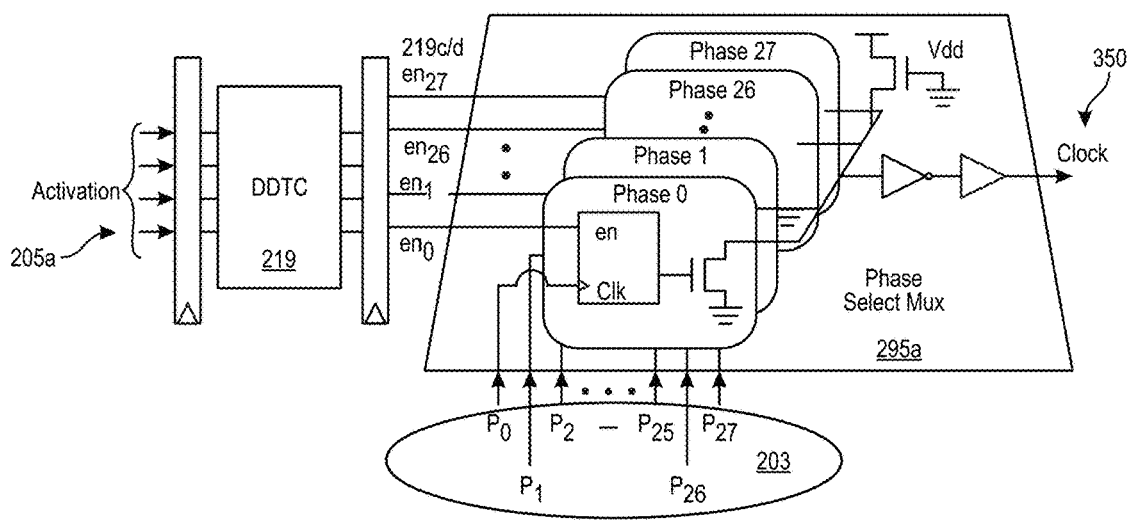
FIG. 3D illustrates a phase select multiplexer for clock phase selection by a data detection and timing control circuit.

FIG. 3C illustrates rotary runtime phase selections (e.g., $P_2$ and $P_3$) between neighboring clock domains (e.g., $CDM_0$ and $CDM_1$). FIG. 3D illustrates a phase select multiplexer 295a for clock phase selection (e.g., signals 219c and 219d) by a data detection and timing control circuit 219 to clock a local clock domain (e.g., $CDM_0$) with a clock cycle (or clock period) $T_{CLKx}$ from local clock signal (e.g., $CLK_0$) 350.

In summary, the local clock $CLK_0$ 350 for the time domain $CDM_0$ may be controlled by (1) static stage timing borrowing based on instructions (i.e., SIMD or Systolic dataflow types), and (2) dynamic phase select based on runtime operands, as shown in FIG. 3B. The DDTC circuit 219 may be realized cycle-by-cycle clock management, such as through detecting runtime transitions of activation (i.e., data 205a read from memory 206a) to guide the clocking edge of the (i.e., clock period $T_{CLKx}$) local clock signal (e.g., $CLK_0$) 350 through detection of: (a) transition condition of each bit may be detected by the DDTC circuit 219; (b) significance of each transition bit (e.g., using a timing table 229t in FIG. 4B); and (c) summation of bit significances (e.g., Sum=$S_1$+$S_6$).

Figure 4A:
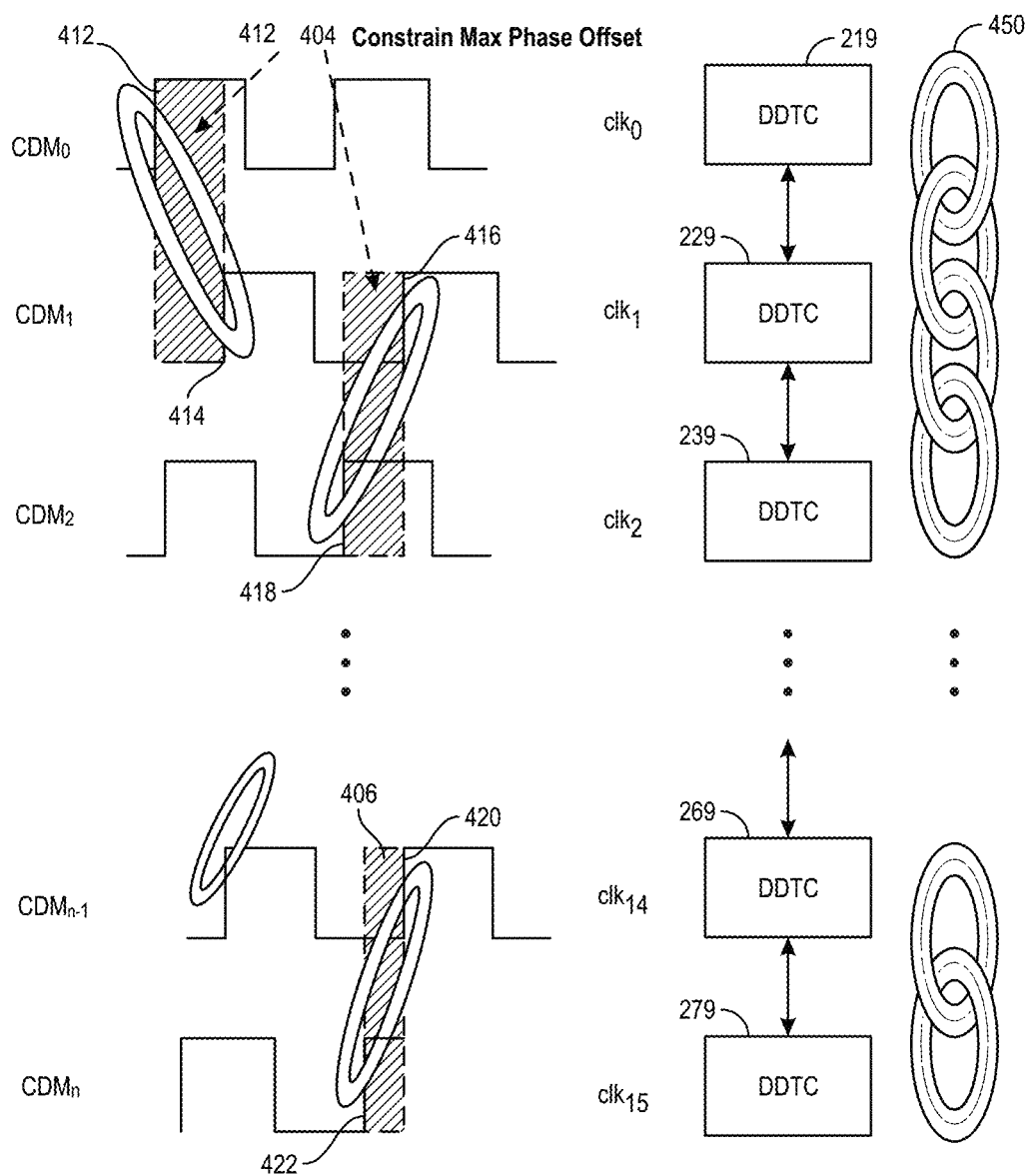
FIG. 4A depicts an exemplary clock-chain synchronization policy between neighboring clock domains.

FIG. 4A depicts a compute-adaptive elastic clock-chain synchronization policy between neighboring clock domains. Synchronization issues caused by different clock domains (e.g., $CDM_0$ to $CDM_{15}$) running at different speed may be corrected by using DDTC circuits (e.g., 219 in $CDM_0$ to 279 in $CDM_{15}$) to constrain maximum phase offsets shown as shaded areas 402, 404 and 406 (e.g., timing difference between rising edges 412/414/418, . . . 420/422 of neighboring time domains,) between its neighboring clock domains (e.g., $CDM_0$/$CDM_1$, $CDM_1$/$CDM_2$, $CDM_{n-1}$/$CDM_n$). By being loosely constrained within maximum phase offsets between neighboring clock domains (e.g., $CDM_0$/$CDM_1$, $CDM_1$/$CDM_2$, $CDM_{n-1}$/$CDM_n$), an elastic clock-chain synchronization policy 450 is thus formed.

Figure 4B:
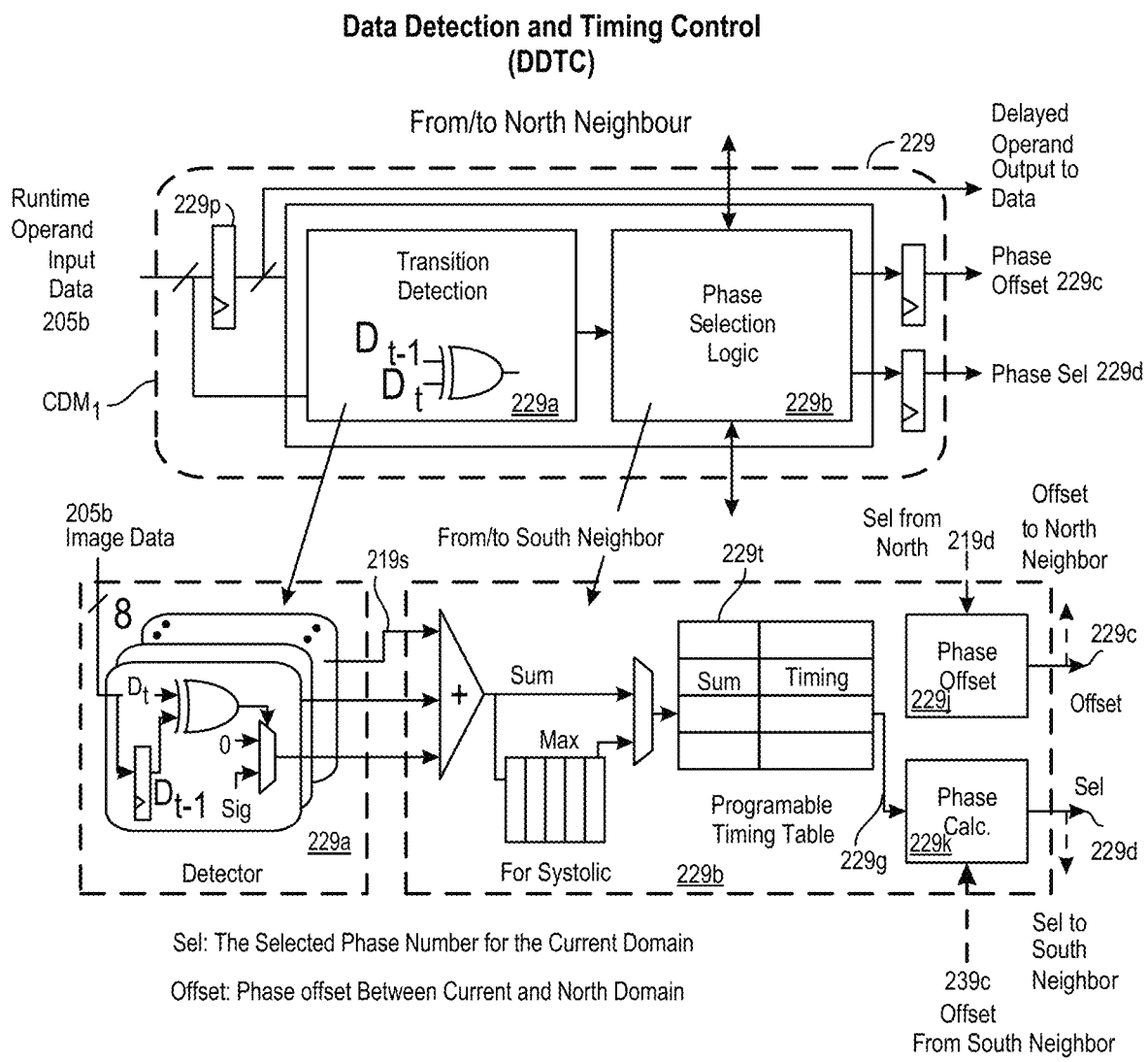
FIG. 4B illustrates an exemplary data detection and timing control circuit.

FIG. 4B illustrates an exemplary data detection and timing control circuit 229 in time domain $CDM_1$. Depending on runtime instructions/configurations (e.g., SIMD or systolic dataflow types), a programmable timing table 229t may be configured to define a maximum phase offset of up to 0.3 ns (or 25% of clock period) among neighboring clocks (e.g., $CLK_0$ and $CLK_2$) inside the DDTC circuit 229. Image data 205b fetched from the image memory 206b (i.e., memory A) may first pass through a single-stage data buffer 229p. A transition detector 229a built from exclusive OR (XOR) circuits detect the transitioning bits, with their significance summed up (e.g., Sum=$S_0$+$S_7$) and sent to the following selection logic 229b. The significance of each transitioning data bit may be programmed (see programmable timing table 229t) to accommodate the timing margin Δt difference and Process-Voltage-Temperature (PVT) variations. The programmable lookup table 229t may store timing control levels, and may use a queue for systolic dataflow for worst-case timing.

The small lookup table (i.e., programmable timing table 229t) for the summed significance value may be used to determine target dynamic clock period settings 229g for a next clock cycle (e.g., $T_{CLKx+1}$). The phase-selection logic 229b may utilize a target clock period setting 229g, as well as the respective phase offset information (219d and 239c) from two respective neighbors, i.e. North neighbor (i.e., $CDM_0$) and South neighbor (i.e., $CDM_2$), to decide which phase offset information (229c, 229d) to set the clock phase (e.g., $P_3$) for the current time domain (i.e., $CDM_1$) to use for the next clock cycle (e.g., $T_{CLKx+1}$).

Figure 4C:
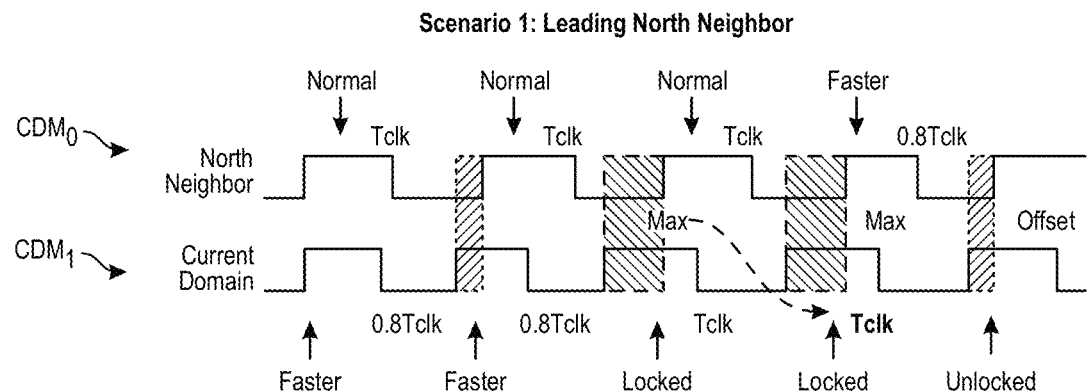
FIGS. 4C-D illustrate timing control with neighboring clock domains.
Figure 4D:
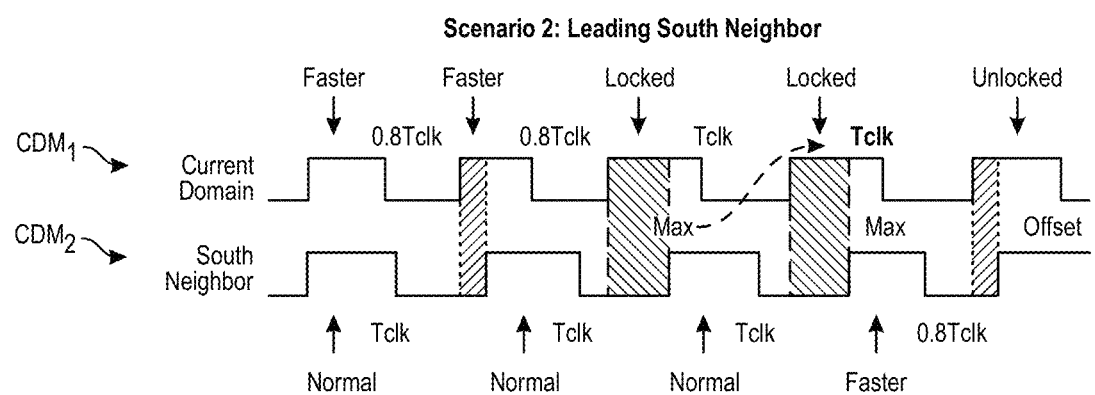

FIGS. 4C and 4D illustrate timing control of the current clock domain (i.e., $CDM_1$) with a north neighboring domain (i.e., $CDM_0$) and a south neighboring clock domain (i.e., $CDM_2$). It may be shown in FIGS. 4C and 4D that the current clock domain (i.e., $CDM_1$) being faster (i.e., with a shorter clock period of 0.8Tclk) than its north and south neighbors (i.e., $CDM_0$, $CDM_2$) for the first two clock cycles. Therefore, the DDTC 229 of the current clock domain (i.e., $CDM_1$) operates to slow down its clock rate (i.e., by increasing a clock period) by n amount not to exceed a max offset constraint (see shaded area) in order to synchronize with its north and south neighbors (i.e., $CDM_0$, $CDM_2$), respectively.

It may be shown in FIGS. 4C and 4D, that the current clock domain (i.e., $CDM_1$) shows an overall data buffering (229p) in the DDTC 219 which may introduce a negligible one cycle of clock delay (i.e., unlocked clock cycle) in the accelerator's execution.

Figure 5A:
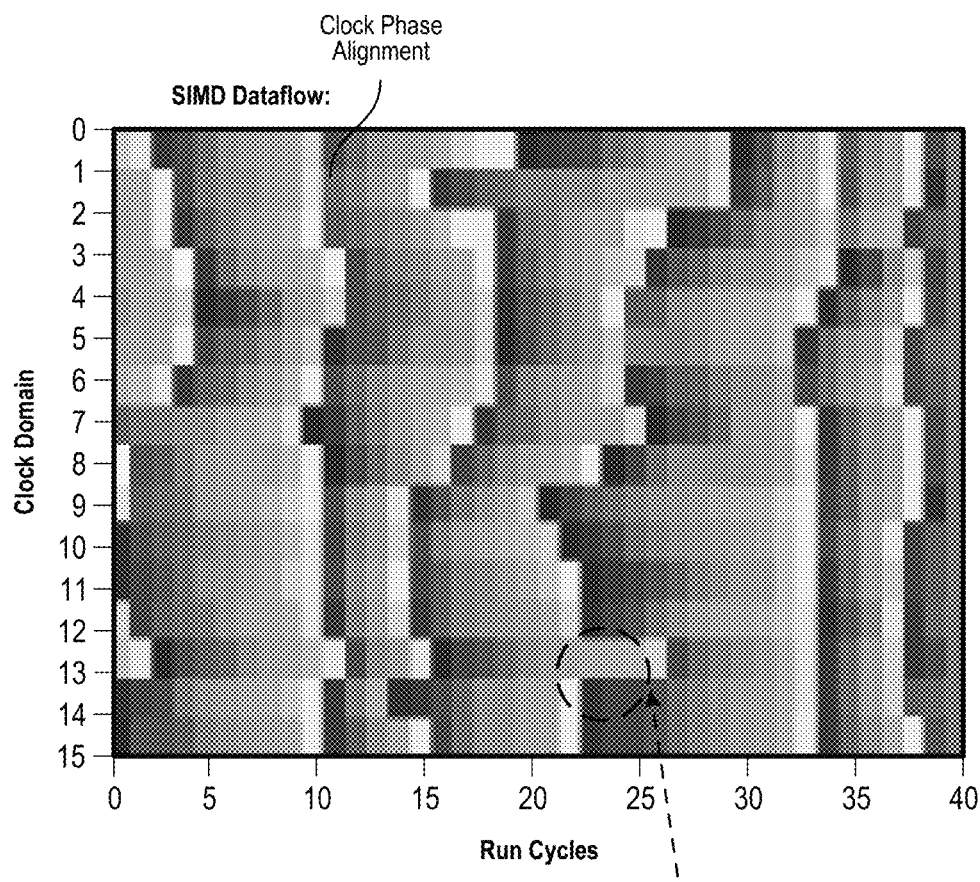
FIGS. 5A, 5C compare exemplary clock chain propagation map and waveforms for SIMD and Systolic dataflow.
Figure 5B:
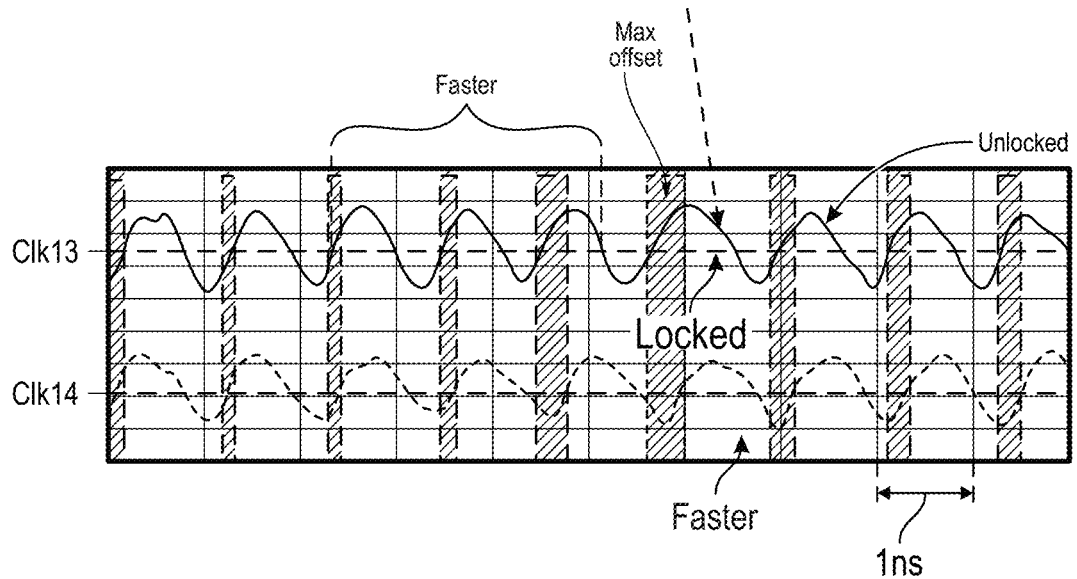
FIGS. 5B, 5D compare clock chain domains phase delay between SIMD and Systolic dataflow.
Figure 5C:
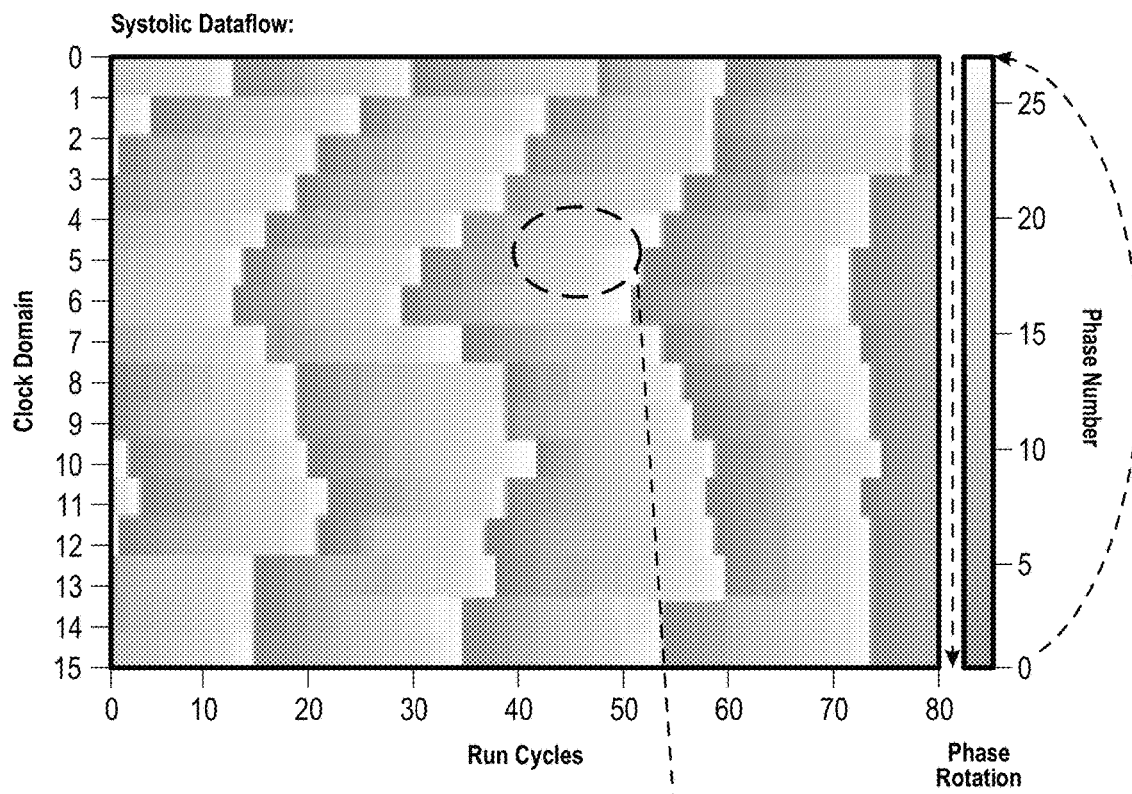
Figure 5D:
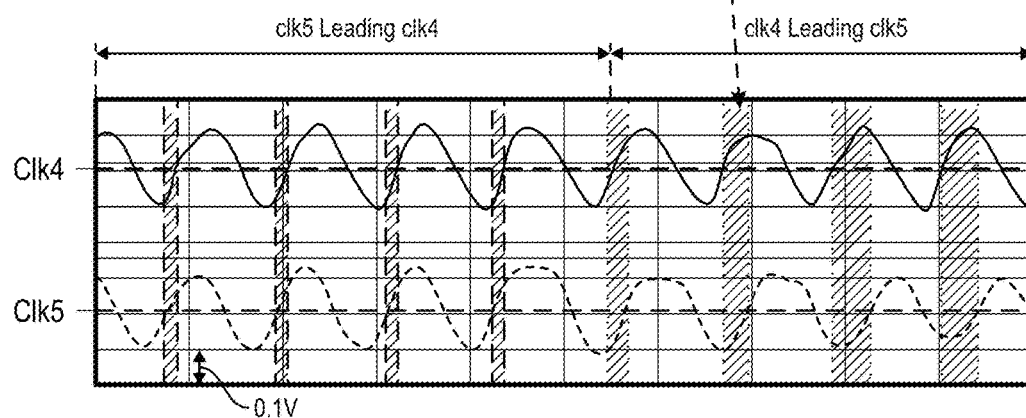

FIGS. 5A, 5C compare exemplary clock chain propagation map and waveforms for SIMD and Systolic dataflow. FIGS. 5B, 5D compare clock domains (i.e., $CDM_0$ to $CDM_{15}$), phase delay between SIMD and Systolic dataflow. A deep shade represents a low phase number (i.e., small phase delay) and a light shade represents a high phase number (i.e., large phase delay). It may be shown that as run cycles propagates, the respective DDTC in each clock domain may select a number to speed up to synchronize with its adjacent neighbors which may be immediately north neighbor and south neighbor. It may be seen that Systolic dataflow has slower propagation as considering more operands are used (e.g., waiting for output operands from previous columns of processing elements as well as from previous row of processing elements). Phase rotations facilitates the elastic chain synchronization policy 450 across the clock domains (i.e., $CDM_0$ to $CDM_{15}$) in the processing pipeline.

Figure 5E:
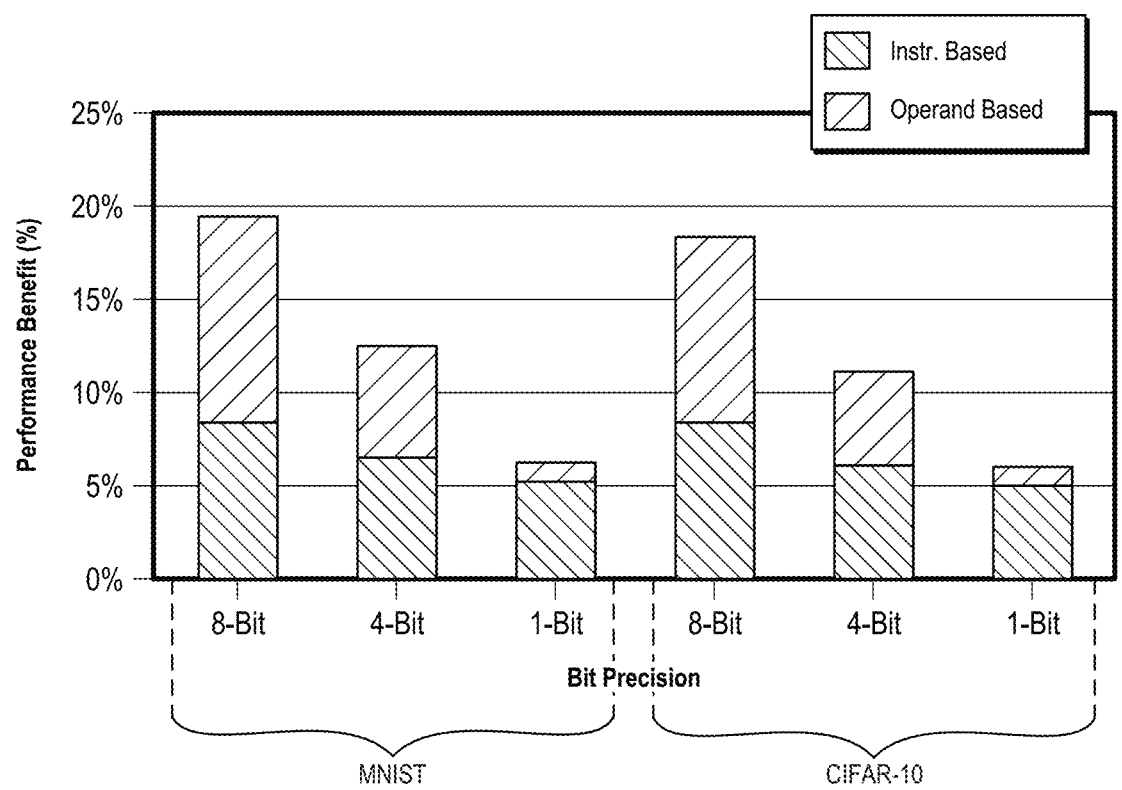
FIGS. 5E, 5F compare clocking benefit between SIMD and Systolic dataflow.
Figure 5F:
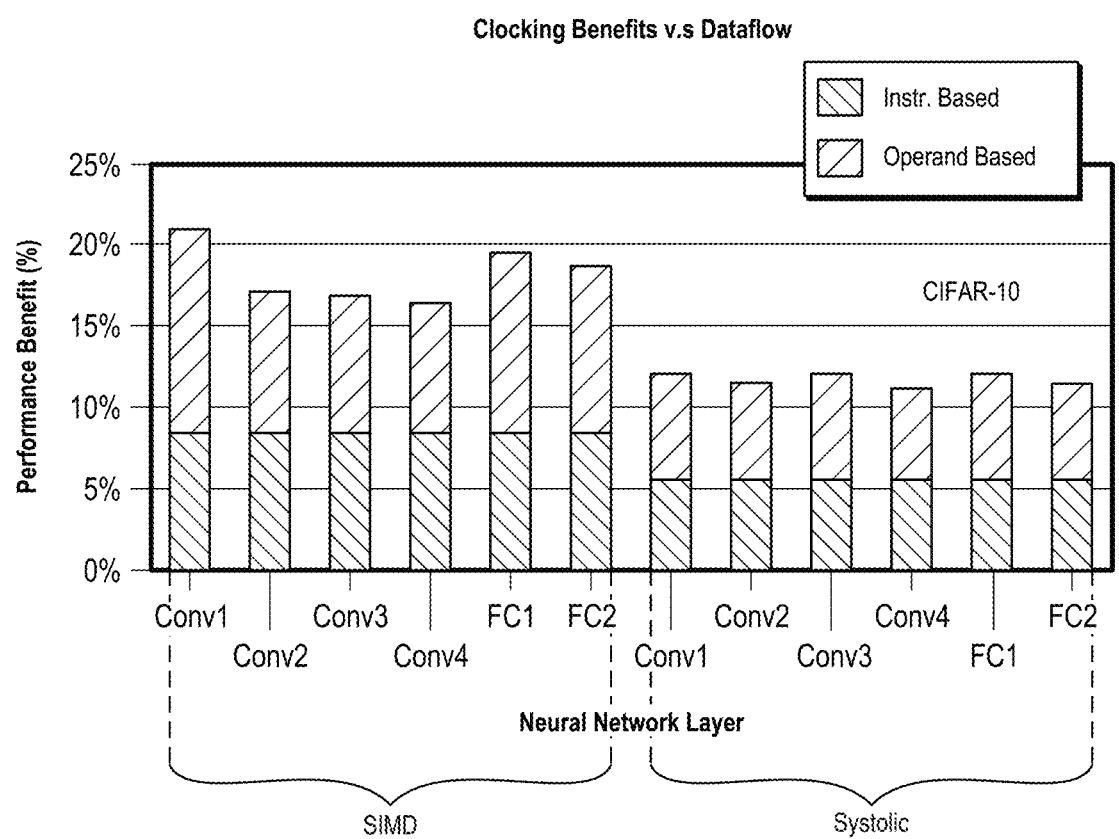

FIGS. 5E, 5F compare clocking benefit between SIMD and Systolic dataflow, based on calibrated measurements under MNIST and CIFAR-10 standards. In an example, it may be shown in FIG. 5E that up to 19% performance improvement may be obtained when using INT8 mode, and up to 6% performance improvement may be obtained when using INT18 mode due to diminishing operand benefits. FIG. 5F shows that for neural network layer, systolic dataflow type may obtain about 10% less performance improvement compared with SIMD dataflow type due to loses in instruction and operand benefits. Overall, it was evaluated that there was at least a 34% in energy savings by requiring a lower operating voltage Vdd down to 0.5V.

Figure 6A:
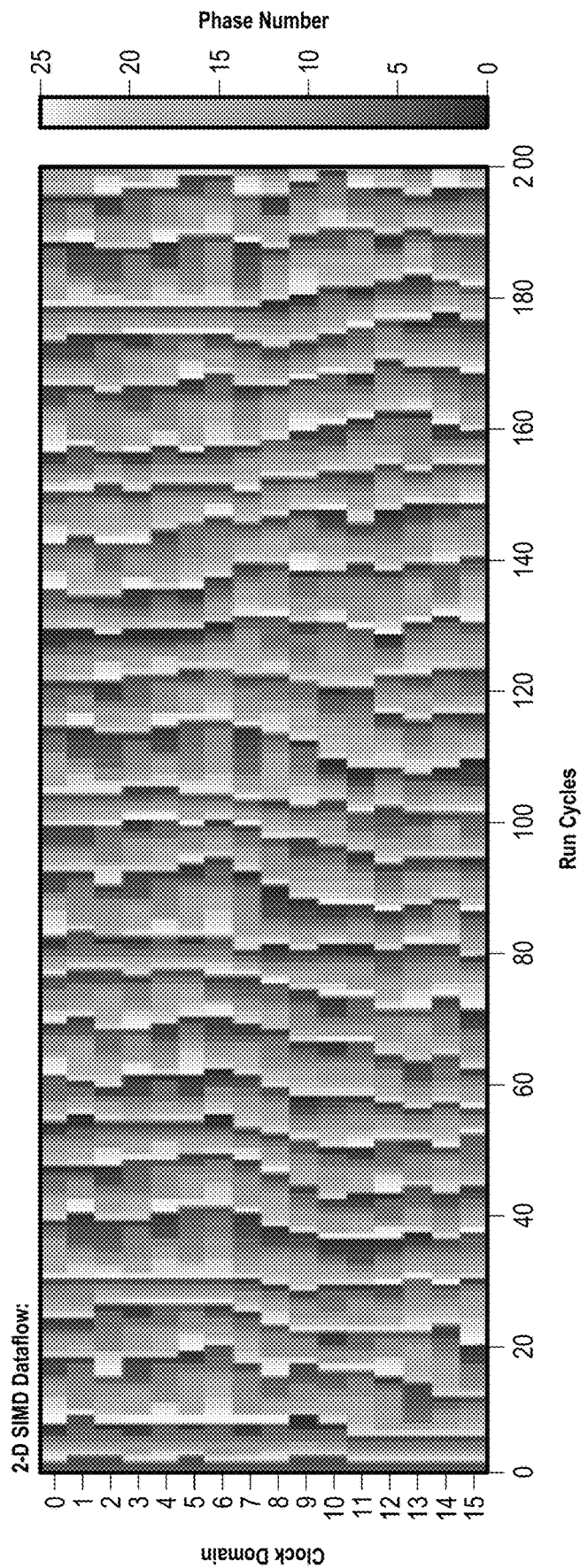
FIGS. 6A, 6B compare exemplary clock chain propagation in color map and waveforms for SIMD and Systolic dataflow in longer run cycles.
Figure 6B:
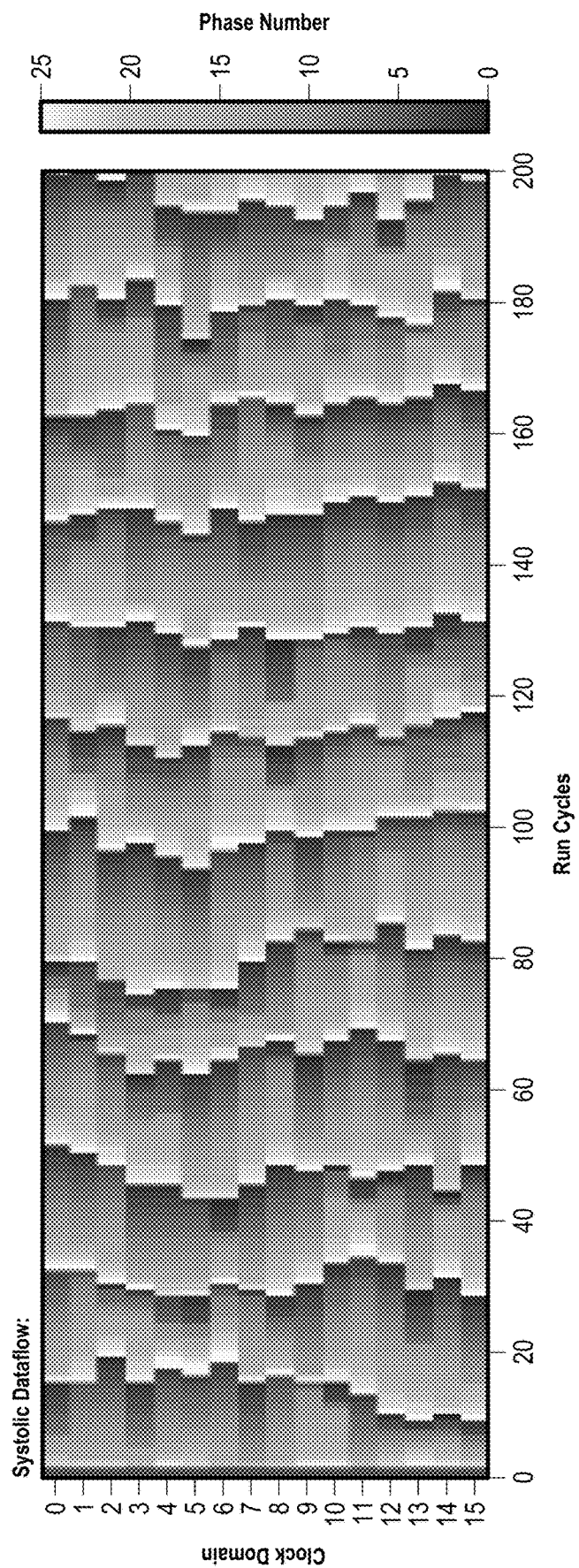

FIGS. 6A, 6B compare exemplary clock chain propagation in color map and waveforms for SIMD and Systolic dataflow in longer run cycles.

Figure 7A:
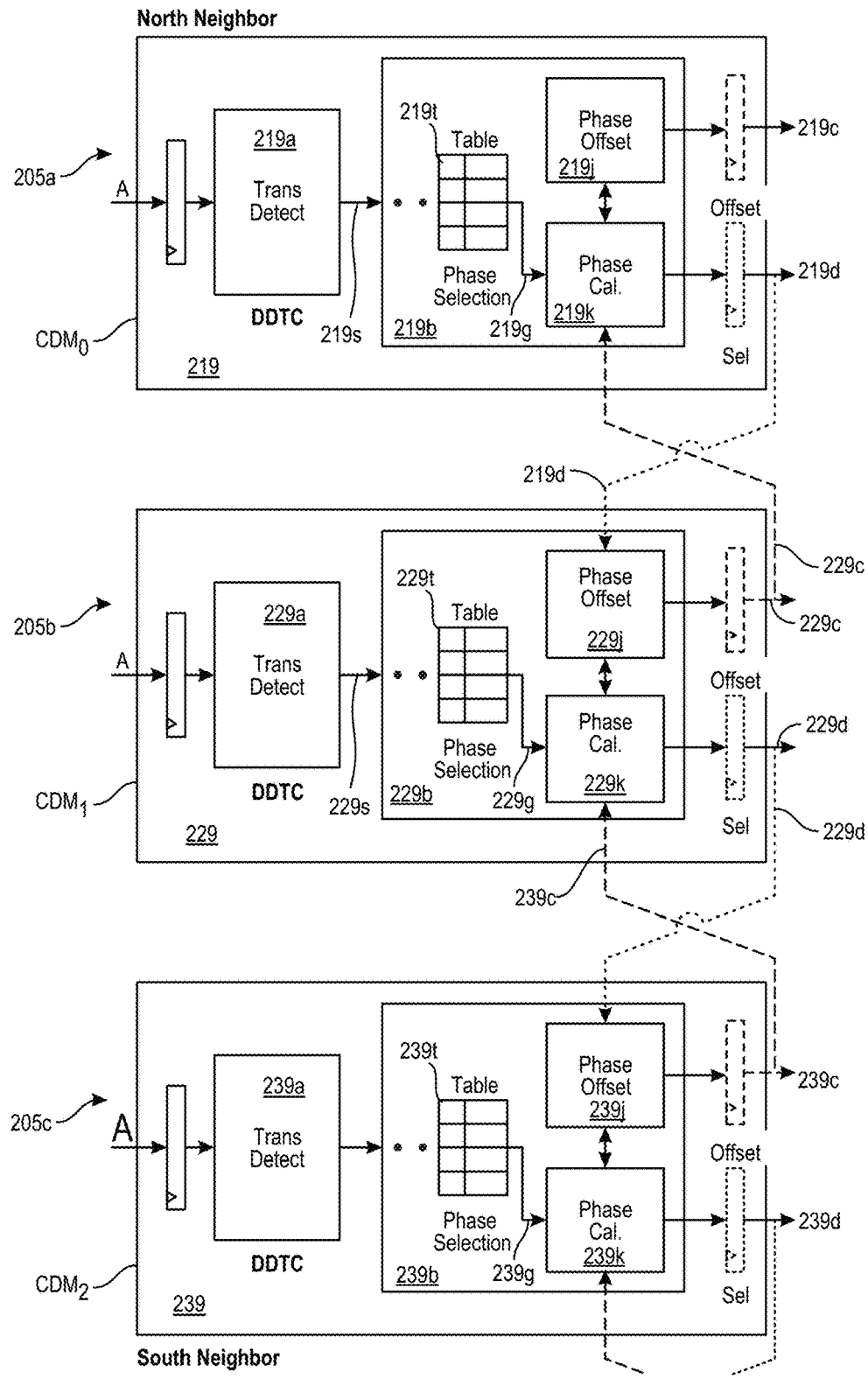
FIG. 7A illustrates signal paths between neighboring clock domains for synchronization and timing control.

FIG. 7A illustrates signal paths between neighboring clock domains for synchronization and timing control. For 2D SIMD dataflow, single transition detection may be used for the entire row of PE units. For systolic dataflow, because the data travels horizontally (refer to FIG. 1A), for m=8 (8 columns in the array), the history of transition results may be kept locally and the worst case may be selected across 8 previous clock cycles (e.g., paths 170a to 170m in FIG. 1A). As a result of the elastic clock-chain synchronization policy 450, if one domain is too fast (i.e., $CDM_1$), it will be locked by a neighboring domain (i.e., $CDM_0$) until the neighbors (i.e., $CDM_0$, $CDM_2$) catch up, leading to a wave-like phase propagation (see FIGS. 5A and 5C).

FIG. 7A illustrates a current clock domain of $CDM_1$ (in row 1) having a north neighbor $CDM_0$ (i.e., adjacent neighbor from previous row 0), and a south neighbor $CDM_2$ (i.e., adjacent neighbor from subsequent row 1). The elastic chain synchronization policy 450 may be illustrated by the DDTC 229 from the current clock domain $CDM_1$ receiving data signals (e.g., 205b) from a first memory 206b and respective synchronization signals 219d from a DDTC 219 of its north neighbor $CDM_0$ and synchronization signals 239c from a DDTC 239 of its south neighbor $CDM_2$. Likewise, the DDTC 229 of the current clock domain $CDM_1$ main send its phase offset synchronization signal 229c to calibrate a phase calibration 219k in the DDTC 219 of its north neighbor $CDM_0$ and send a phase select synchronization signals 229d to the phase offset 239j in the DDTC 239 of its south neighbor $CDM_2$.

The DDTC 229 may perform a phase calibration in a phase calibration circuit 229k according to: (a) a phase selection value 239g from a look up table 239t, (b) the phase calibration synchronization signal 219d from its north neighbor $CDM_0$ in a phase offset 229j circuit, and (c) the phase offset synchronization signal 239c from its south neighbor $CDM_2$ in a phase offset 229j circuit; to determine an output phase select signal 229d to select a phase number (e.g., $P_3$) for the clock $CLK_1$ to clock the processing elements 220 to 227 in next clock cycle (e.g., $T_{CLKx+1}$).

Figure 8:
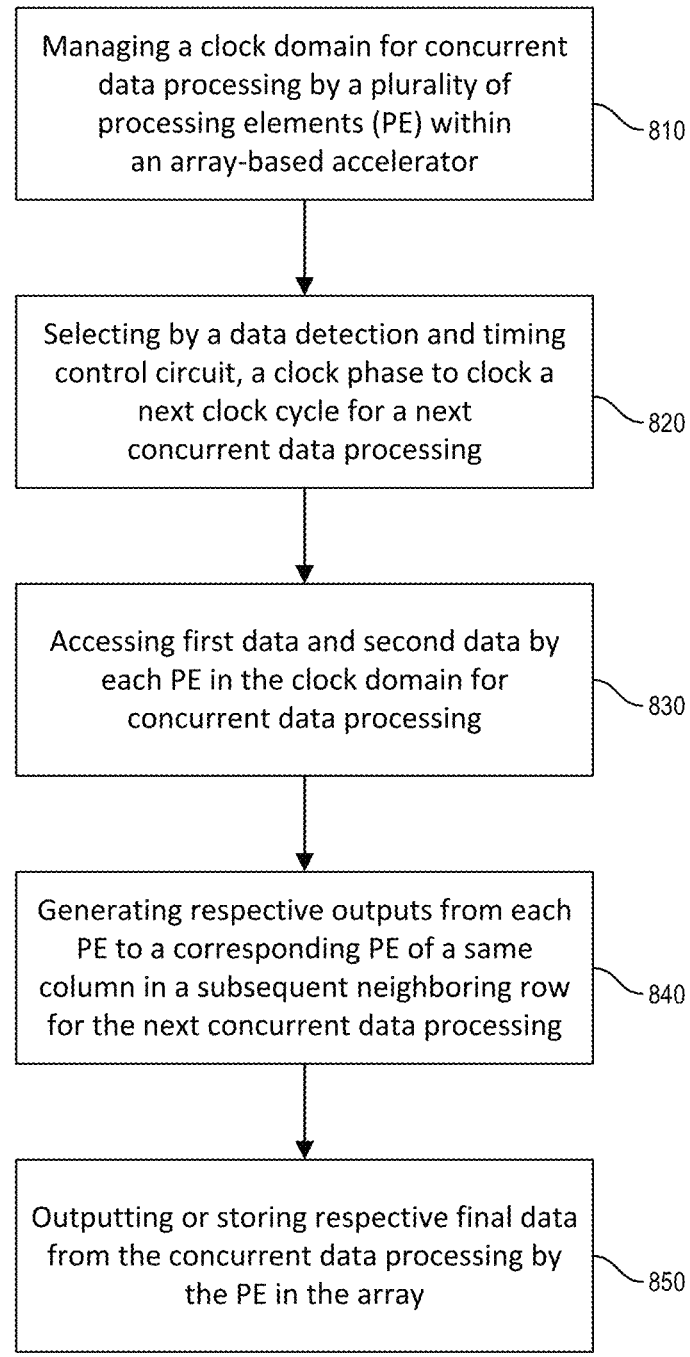
FIG. 8 illustrates a method of concurrent data processing in array-based accelerators.

FIGS. 7B1 and 7B2 illustrate timing closure signal paths between neighboring clock domains for synchronization and timing control. As shown in FIGS. 7B1 and 7B2, that data paths 229c with 219d, and 229d with 239c are inter-domain feedback data paths crossing clock domains (i.e., $CDM_1$/$CDM_0$, $CDM_1$/$CDM_2$) with a timing closure, setting up a phase margin to satisfy the setup or hold requirements at PE boundaries in the clock domain $CDM_1$ as follows:

Setup: $t_{setup} = T_{clk,min} - (t_{offset,out,max} + \max(t_{sel,in}, t_{offset,in})) - t_{s,FF} - t_{domain,skew}$ Hold: $t_{hold} = (t_{offset,out,max} + \min(t_{sel,in}, t_{offset,in})) - t_{h,FF} - t_{domain,skew}$    Path 1:

Setup: $t_{setup} = T_{clk,min} - (t_{offset,out,max} + \max(t_{sel,in}, t_{offset,in})) - t_{s,FF} - t_{domain,skew}$ Hold: $t_{hold} = (t_{sel,out,max} + \min(t_{sel,in}, t_{offset,in})) - t_{h,FF} - t_{domain,skew}$    Path 2:

FIG. 8 illustrates a method of concurrent data processing and clock management in data processing by array-based accelerators. Description of the method have been provided in the summary section of the disclosure and in the system description which will not be repeated.

A 65 nm test chip was built to demonstrate the proposed clock chain scheme. Up to four high-speed phases may be captured in a real-time oscilloscope simultaneously during testing and the phase offsets in measurement ports are calibrated. Clock phases across all the clock domains were repetitively measured to reconstruct the clock propagation map. FIGS. 5A, 5D show the measured color map representing the phase selection at each clock domain along execution cycles. The locking conditions may be observed with a large phase offset between neighboring clock domains. Different neural network layers in MINIST and CIFAR-10 database have been measured under various bit precisions with up to 19% performance gain or equivalent 34% energy savings using reduced supply voltage (e.g., 0.5V). At lower precision, as the timing is more limited by various control paths, the operand-based adaptive operation offers less benefits. 2D SIMD dataflow (see FIG. 5C) shows more benefits than the systolic dataflow (see FIG. 5F) which needs to consider the worst-case timing within the past eight clock cycles. This disclosure extends the dynamic timing detection scheme to a large 128-PE array accelerator, which is difficult to handle using previous adaptive schemes. A 3.3% area overhead is observed due to the use of DDTC module and additional clock routing. A larger PE array may be implemented within the scope of this disclosure.

Other systems, methods, features and advantages will be, or will become, apparent to one with skill in the art upon examination of the figures and detailed description. It is intended that all such additional systems, methods, features and advantages be included within this description, be within the scope of the disclosure, and be protected by the following claims. Steps mentioned in the disclosure may be carried out in any sequence or orders without limitation to achieve the intended objectives.

We claim:

1. A system for clock management in data processing by array-based accelerators, comprising:
   a plurality of processing elements of array-based accelerators arranged in an array comprising n rows and m columns of processing elements for concurrent data processing, wherein m and n are both integers greater than or equal to two, wherein each respective row of the array comprises:
   a clock domain that clocks respective runtime clock cycles for each of the m processing elements for the concurrent data processing within a current row, wherein the clock domain further comprises a data detection and timing control circuit which is coupled to a common clock phase bus which provides a local clock source in multiple selectable phases, wherein the data detection and timing control circuit is configured to select a clock phase to clock a next clock cycle for a next concurrent data processing by the m processing elements, wherein the data detection and timing control circuit is configured to provide a dynamic cycle to cycle clock management to select a clock phase with a resolution no fewer than 4 phase settings, to a local clock period in the next clock cycle through a glitch-free phase selection multiplexer to shift the clock domain for the current row, which is based on at least one or more of:
  static stage timing borrowing based on predefined configuration instructions associated with dataflow types for the array-based accelerators,
  bit transitioning of the first data during a runtime clock cycle,
  runtime operands detection from the first data,
  a total number of the m processing elements in the current row, and
  runtime phase configurations of adjacent neighboring clock domains,
  such that the dynamic cycle to cycle clock management provides an elastic clock chain synchronization in the clock rate selection and the clock phase selection in the next clock cycle between a clock domain in the current row and an adjacent neighboring clock domain;
a first memory storing first data and a second memory storing respective second data which are accessible by each of m processing elements in the clock domain for the concurrent data processing and to generate respective outputs from each of the m processing elements to a corresponding m processing element of a same column in a subsequent neighboring row for the next concurrent data processing in the next clock cycle; and
an interface coupled to each of the m processing elements of a last row of the array to output or store respective final data from the concurrent data processing by the plurality of processing elements in the array.

2. The system of claim 1, wherein the data detection and timing control circuit in the clock domain of the current row is coupled to a data detection and timing control circuit in the adjacent neighboring clock domain, wherein the adjacent neighboring clock domain is a clock domain from at least one or both of a row before and a row after the current row.

3. The system of claim 1, wherein the data detection and timing control circuit in each row comprises a buffer for buffering during each runtime clock cycle, the predefined configuration instructions associated with the dataflow types, for the array-based accelerators prior to monitoring the bit transition of the first data.

4. The system of claim 1 configured to process dataflow types comprising one of:
  a two dimensional (2D) single instruction multiple data (SIMD) dataflow and a systolic dataflow.

5. The system of claim 4, wherein the 2D single instruction multiple dataflow processing comprising each of the m processing elements in each current row configured to:
  receive common first data from the first memory,
  receive respective second data for each individual m processing element from the second memory, and
  receive applicable respective output data generated in a last clock cycle from a corresponding processing element in a same column of a previous row before the current row; and
  process respectively in parallel in the runtime clock cycle by each of the m processing elements, the received common first data, the respective second data and the applicable respective output data generated in the last clock cycle from the corresponding processing element in a same column of the previous row, to generate respective output data to a corresponding processing element in a same column of a next row.

6. The system of claim 4, wherein the systolic array dataflow processing comprising each of the m elements is configured to perform the following respectively:
  receive one of: an output from a processing element of a previous column within a same current row and first data received from the first memory,
  receive respective second data for each individual m processing element from the second memory, and
  receive applicable respective output data generated in a last clock cycle from a corresponding processing element in a same column of a row before the current row; and
  process respectively in parallel in the current runtime clock cycle by each of the m processing elements respectively, the one of received output from the processing element of the previous column within the same current row and the received first data, the respective second data and the applicable respective output data generated in the last clock cycle from the corresponding processing element in the same column, to generate respective output data to a corresponding processing element in a same column of a next row.

7. The system of claim 2, wherein the data detection and timing control circuit comprises a phase selection portion that outputs both a phase select value and a phase offset value, wherein the phase selection portion receives phase calibration information from both an on-chip phase selection table and from a subsequent phase offset value output from another data detection and timing control circuit of the adjacent neighboring clock domain from at least one or both of the row before and the row after the current row.

8. The system of claim 1, wherein the local clock source in multiple selectable phases comprises a phase locked global clock coupled to a tunable clock buffer and a phase selectable delay locked loop (DLL) clock circuit for generating a plurality of clock phases which are coupled to the common clock phase bus.

9. The system of claim 8, wherein the common clock phase bus which provides the local clock source in multiple selectable phases is phase matched to the data detection and timing control circuit in each and every clock domain.

10. A method for clock management in data processing by array-based accelerators, comprising:
  managing a clock domain for concurrent data processing by a plurality of processing elements within array-based accelerators, wherein the plurality of processing elements are arranged in an array comprising n rows and m columns of processing elements for processing data, wherein m and n are both integers greater than or equal to two, wherein the clock domain clocks respective runtime clock cycles for each of the m processing elements for concurrent data processing within a current row, wherein the clock domain further comprises a data detection and timing control circuit which is coupled to a common clock phase bus which provides a local clock source in multiple selectable phases, wherein the data detection and timing control circuit is configured to provide a dynamic cycle to cycle clock management to select a clock phase with a resolution no fewer than 4 phase settings, to a local clock period in the next clock cycle through a glitch-free phase selection multiplexer to shift the clock domain for the current row, which is based on at least one or more of:

static stage timing borrowing based on predefined configuration instructions associated with dataflow types for the array-based accelerators, bit transitioning of the first data during a runtime clock cycle, runtime operands detection from the first data, a total number of the m processing elements in the current row, and runtime phase configurations of adjacent neighboring clock domains, such that the dynamic cycle to cycle clock management provides an elastic clock chain synchronization in the clock rate selection and the clock phase selection in the next clock cycle between a clock domain in the current row and an adjacent neighboring clock domain, and wherein the managing of the clock domain for clocking the m processing elements comprises:

selecting by the data detection and timing control circuit, a clock phase for a next clock cycle to carry out a next concurrent data processing by the m processing elements, accessing, first data stored in a first memory and respective second data stored in a second memory, by the m processing elements in the clock domain for the concurrent data processing, and generating respective outputs from each of the m processing elements to a corresponding m processing element of a same column in a subsequent neighboring row for the next concurrent data processing in the next clock cycle; and outputting or storing respective final data from the concurrent data processing by the plurality of the processing elements in the array, by an interface which is coupled to m processing elements of a last row of the array.

11. The method of claim 10, wherein the data detection and timing control circuit in the clock domain of the current row is coupled to a data detection and timing control circuit in the adjacent neighboring clock domain, wherein the adjacent neighboring clock domain is a clock domain from at least one or both of a row before and a row after the current row.

12. The method of claim 10, wherein the data detection and timing control circuit in each row comprises a buffer for buffering during each runtime clock cycle, the predefined configuration instructions associated with the dataflow types, for the array-based accelerators prior to monitoring the bit transition of the first data.

13. The method of claim 10, wherein the concurrent data processing comprising one of:

a two dimensional (2D) single instruction multiple data (SIMD) dataflow and a systolic dataflow.

14. The method of claim 13, wherein the 2D single instruction multiple dataflow processing comprising configuring each of the m processing elements in each current row to perform:

receiving common first data from the first memory, receiving respective second data for each individual m processing element from the second memory, and receiving applicable respective output data generated in a last clock cycle from a corresponding processing element in a same column of a previous row before the current row; and processing respectively in parallel in the runtime clock cycle by each of the m processing elements, the received common first data, the respective second data and the applicable respective output data generated in the last clock cycle from the corresponding processing element in the same column of the previous row, to generate respective output data to a corresponding processing element in a same column of a next row.

15. The method of claim 13, wherein the systolic array dataflow processing comprising configuring each of the m elements to perform:

receiving one of: an output from a processing element of a previous column within a same current row and first data received from the first memory, receiving respective second data for each individual m processing element from the second memory, and receiving applicable respective output data generated in a last clock cycle from a corresponding processing element in a same column of a row before the current row; and processing respectively in parallel in the current runtime clock cycle by each of the m processing elements respectively, the one of received output from the processing element of the previous column within the same current row and the received first data, the respective second data and the applicable respective output data generated in the last clock cycle from the corresponding processing element in the same column, to generate respective output data to a corresponding processing element in a same column of a next row.

16. The method of claim 11, wherein the data detection and timing control circuit comprises a phase selection portion that outputs both a phase select value and a phase offset value, wherein the phase selection portion receives phase calibration information from both an on-chip phase selection table and from a subsequent phase offset value output from another data detection and timing control circuit of the adjacent neighboring clock domain from at least one or both of the row before and the row after the current row.

17. The method of claim 10, wherein the local clock source in multiple selectable phases comprises a phase locked global clock coupled to a tunable clock buffer and a phase selectable delay locked loop (DLL) clock circuit for generating a plurality of clock phases which are coupled to the common clock phase bus.

18. The method of claim 17, wherein the common clock phase bus which provides the local clock source in multiple selectable phases is phase matched to the data detection and timing control circuit in each and every clock domain.

* * * * *